(12) United States Patent
Kim

(10) Patent No.: US 11,451,160 B2
(45) Date of Patent: Sep. 20, 2022

(54) IMAGE DISPLAY APPARATUS

(71) Applicant: LG ELECTRONICS INC., Seoul (KR)

(72) Inventor: Dohoon Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 108 days.

(21) Appl. No.: 16/727,749

(22) Filed: Dec. 26, 2019

(65) Prior Publication Data

US 2020/0212810 A1 Jul. 2, 2020

(30) Foreign Application Priority Data

Dec. 26, 2018 (KR) .................. 10-2018-0169757

(51) Int. Cl.
*H02M 7/219* (2006.01)
*G09G 3/3233* (2016.01)
*H02M 3/335* (2006.01)
*H02M 1/00* (2006.01)

(52) U.S. Cl.
CPC .......... *H02M 7/219* (2013.01); *G09G 3/3233* (2013.01); *G09G 2300/0814* (2013.01); *G09G 2320/103* (2013.01); *G09G 2330/021* (2013.01); *G09G 2330/022* (2013.01); *H02M 1/0035* (2021.05); *H02M 1/0085* (2021.05); *H02M 3/33507* (2013.01)

(58) Field of Classification Search
None
See application file for complete search history.

(56) References Cited

U.S. PATENT DOCUMENTS

| | | | | |
|---|---|---|---|---|
| 8,736,543 B2* | 5/2014 | Kubota | ................ | G09G 3/3426 345/102 |
| 8,896,638 B2* | 11/2014 | Kurabayashi | ........ | G09G 3/3426 345/691 |
| 10,311,833 B1* | 6/2019 | Qiu | ........................ | G09G 3/003 |

(Continued)

FOREIGN PATENT DOCUMENTS

| JP | 2017143599 | 8/2017 |
|---|---|---|
| KR | 1020130092924 | 8/2013 |

(Continued)

OTHER PUBLICATIONS

PCT International Application No. PCT/KR2019/018484, International Search Report dated Apr. 22, 2020, 3 pages.

*Primary Examiner* — Alexander H Taningco
*Assistant Examiner* — Jianzi Chen
(74) *Attorney, Agent, or Firm* — Lee, Hong, Degerman, Kang & Waimey PC

(57) ABSTRACT

Disclosed is an image display apparatus including: a display; and a power supply configured to supply power to the display; wherein the power supply comprises a converter including at least one switching element and configured to output direct-current (DC) power by converting a level of input power based on a switching operation of the at least one switching element, and wherein, a first mode where the at least one switching element performs a switching operation continuously or a second mode where the at least one switching element stops the switching operation are performed according to a load at an output terminal of the converter. Accordingly, power consumption required to display an image may be reduced.

12 Claims, 16 Drawing Sheets

(56) References Cited

U.S. PATENT DOCUMENTS

| | | | |
|---|---|---|---|
| 2007/0058402 A1* | 3/2007 | Shekhawat | H02M 1/42 363/89 |
| 2007/0146485 A1* | 6/2007 | Horikoshi | G09G 3/007 348/173 |
| 2010/0171776 A1* | 7/2010 | Yamagata | G09G 3/3406 345/691 |
| 2011/0157256 A1* | 6/2011 | Sakamoto | G09G 3/344 345/214 |
| 2013/0235941 A1* | 9/2013 | Koo | G09G 5/006 375/240.26 |
| 2014/0320059 A1* | 10/2014 | Shimomugi | H05B 6/06 318/801 |
| 2015/0028778 A1* | 1/2015 | Zudrell-Koch | H05B 45/60 315/308 |
| 2015/0116300 A1 | 4/2015 | Yamaki et al. | |
| 2015/0145901 A1* | 5/2015 | Lee | G09G 3/3614 345/96 |
| 2015/0187277 A1* | 7/2015 | Maeyama | G09G 3/3225 345/694 |
| 2015/0207421 A1* | 7/2015 | Ryu | H05B 45/385 363/21.01 |
| 2015/0243232 A1* | 8/2015 | Kim | G09G 3/3648 345/214 |
| 2016/0329816 A1* | 11/2016 | Zhang | H02M 3/33507 |
| 2017/0250605 A1* | 8/2017 | Park | G09G 3/3266 |
| 2018/0336840 A1* | 11/2018 | Niikura | G09G 3/34 |
| 2019/0005890 A1* | 1/2019 | Lim | G09G 3/342 |
| 2019/0034026 A1* | 1/2019 | Yeh | G06F 3/04883 |
| 2020/0136512 A1* | 4/2020 | Park | G09G 3/3266 |

FOREIGN PATENT DOCUMENTS

| | | |
|---|---|---|
| KR | 101356292 | 1/2014 |
| KR | 101878175 | 8/2018 |

* cited by examiner

IMAGE DISPLAY APPARATUS

CROSS-REFERENCE TO RELATED APPLICATION

Pursuant to 35 U.S.C. § 119(a), this application claims the benefit of earlier filing date and right of priority to Korean Patent Application No. 10-2018-0169757, filed on Dec. 26, 2018, the contents of which are hereby incorporated by reference herein in its entirety.

BACKGROUND OF THE INVENTION

1. Field of the Invention

The present invention relates to an image display apparatus, and more particularly to an image display apparatus enabled to reduce power consumption required to display an image.

2. Description of the Related Art

An image display apparatus is an apparatus including a function of providing an image that a user can watch. The user can watch various images through the image display apparatus.

Meanwhile, as the image display apparatus is on trend to increase in size, demands for various methods for reducing power consumption of the image display apparatus are increasing as well.

SUMMARY OF THE INVENTION

An object of the present invention is to provide an image display apparatus capable of reducing power consumption when displaying an image.

Another object of the present invention is to provide an image display apparatus capable of reducing power consumption according to load on a converter output terminal at a time of displaying an image or according to an image displayed on a display.

In order to achieve the aforementioned objects, an image display apparatus according to an embodiment of the present invention includes a display; and a power supply configured to supply power to the display; wherein the power supply comprises a converter including at least one switching element and configured to output direct-current (DC) power by converting a level of input power based on a switching operation of the at least one switching element, and wherein a first mode where the at least one switching element performs a switching operation continuously or a second mode where the at least one switching element stops the switching operation are performed according to a load at an output terminal of the converter.

The power supply further may include a controller configured to control the converter, and the controller may be configured to perform the first mode where the at least one switching element performs the switching operation continuously or the second mode where the at least one switching element stops the switching operation according to the load at the output terminal of the converter.

The controller may be configured to perform the first mode when the load at the output terminal of the converter is equal to or higher than a first level, wherein controller may be configured to the second mode when the load at the output terminal of the converter is lower than the first level.

In the second mode, the at least one switching element may perform a switching operation during a first half cycle between the first half cycle and a second half cycle of a cycle of input AC power and temporarily stop the switching operation during the second half cycle.

In the first mode, the at least one switching element may perform the switching operation continuously during the first half cycle and the second half cycle.

The power supply may further include an input voltage detector configured to detect an input AC voltage of input AC power, and the controller may be configured to perform the second mode when the input AC voltage is equal to or higher than a preset level.

The power supply may further include a dc terminal voltage detector configured to detect a voltage at an output terminal of the converter, and the controller may be configured to perform the second mode when the voltage at the output terminal of the converter is equal to or higher than a first preset level, wherein the controller may be configured to the first mode when the voltage at the output terminal of the converter is equal to or higher than a second preset level lower than the first preset level and is lower than the first preset level.

The controller may be configured to stop the switching operation of the at least one switching element during a period of time longer than a cycle of the input AC power when the voltage at the output terminal of the converter is lower than the second preset level.

The controller may be configured to perform the second mode when a level of the load at the output terminal of the converter is equal to or lower than a first reference level, wherein the controller may be configured to the first mode when the level of the load at the output terminal of the converter is higher than the first reference level and is equal to or lower than a second reference level higher than the first reference level.

The controller may be configured to stop the switching operation of the at least one switching element during a period of time longer than a cycle of input AC power when the level of the load at the output terminal of the converter is equal to or higher than the second reference level.

The controller may be configured to perform the second mode when a black area accounts for a predetermined percentage or more in an image displayed on the display.

The controller may be configured to increase duration of the second mode as a percentage of the black area in the image increases.

The controller may be configured to perform the first mode when an image displayed on the display is a still image, wherein the controller may be configured to the second mode when the image displayed on the display is a moving image.

The converter may include a first diode element and a first switching element connected in series with each other; and a second diode element and a second switching element connected in series with each other and in parallel with the first diode element and the first switching element.

The converter may further include: a first inductor disposed between a first node, disposed between the first diode element and the first switching element, and an input terminal; and a second inductor disposed between a second node, disposed between the second diode element and the second switching element, and the input terminal.

An image display apparatus according to another embodiment of the present invention includes: a display including an organic light emitting diode (OLED) panel; and a power supply configured to supply power to the display, wherein the power supply comprises a converter including at least one switching element and configured to output DC power by converting a level of input power based on a switching operation of the at least one switching element, and wherein a first mode where the at least one switching element performs a switching operation continuously or a second mode where the switching operation of the at least one switching element stops the switching operation are performed according to an image displayed on the display.

The controller may be configured to perform the second mode when a black area accounts for a predetermined percentage or more in the image displayed on the display.

The controller may be configured to increase duration of the second mode as a percentage of the black area in the image increases.

The controller may be configured to perform the first mode when the image displayed on the display is a still image, wherein the controller may be configured to perform the second mode when the image displayed on the display is a moving image.

An image display apparatus according to an embodiment of the present invention includes a display; and a power supply configured to supply power to the display; wherein the power supply comprises a converter including at least one switching element and configured to output direct-current (DC) power by converting a level of input power based on a switching operation of the at least one switching element, and wherein a first mode where the at least one switching element performs a switching operation continuously or a second mode where the at least one switching element stops the switching operation are performed according to a load at an output terminal of the converter. Accordingly, power consumption required to display an image may be reduced. In particular, since switching is performed a less number of times in the second mode than in the first mode, switching loss may be reduced and therefore power consumption may be reduced.

The power supply further may include a controller configured to control the converter, and the controller may be configured to perform the first mode where the at least one switching element performs the switching operation continuously or the second mode where the at least one switching element stops the switching operation according to the load at the output terminal of the converter. Accordingly, power consumption required to display an image may be reduced according to a load at an output terminal of the converter.

The controller may be configured to perform the first mode when the load at the output terminal of the converter is equal to or higher than a first level, wherein wherein the controller may be configured to perform the second mode when the load at the output terminal of the converter is lower than the first level. In particular, if the level of the load is lower than the first level, switching is performed according to the second mode, so switching loses may be reduced and therefore power consumption may be reduced.

In the second mode, the at least one switching element may be configured to perform a switching operation during a first half cycle between the first half cycle and a second half cycle of a cycle of input AC power and temporarily stop the switching operation during the second half cycle. In particular, since switching is temporarily stopped during the second half cycle, power consumption may be reduced.

The power supply may further include an input voltage detector configured to detect an input AC voltage of input AC power, and the controller may be configured to perform the second mode when the input AC voltage is equal to or higher than a preset level. Accordingly, since the second mode is performed in a state in which the input voltage is stable, power consumption may be reduced.

The power supply may further include a dc terminal voltage detector configured to detect a voltage at an output terminal of the converter, and the controller may be configured to perform the second mode when the voltage at the output terminal of the converter is equal to or higher than a first preset level, wherein the controller may be configured to perform the first mode when the voltage at the output terminal of the converter is equal to or higher than a second preset level lower than the first preset level and is lower than the first preset level. Accordingly, it is possible to reduce power consumption.

The controller may be configured to stop the switching operation of the at least one switching element during a period of time longer than a cycle of the input AC power when the voltage at the output terminal of the converter is lower than the second preset level. Accordingly, while power consumption is reduced, a circuit element may be protected.

The controller may be configured to perform the second mode when a level of the load at the output terminal of the converter is equal to or lower than a first reference level, wherein the controller may be configured to perform the first mode when the level of the load at the output terminal of the converter is higher than the first reference level and is equal to or lower than a second reference level higher than the first reference level. Accordingly, it is possible to reduce power consumption.

The controller may be configured to stop the switching operation of the at least one switching element during a period of time longer than a cycle of input AC power when the level of the load at the output terminal of the converter is equal to or higher than the second reference level. Accordingly, while power consumption is reduced, a circuit element may be protected.

The controller may be configured to perform the second mode when a black area accounts for a predetermined percentage or more in an image displayed on the display. Accordingly, it is possible to reduce power consumption depending on an image.

The controller may be configured to increase duration of the second mode as a percentage of the black area in the image increases. Accordingly, as power consumption is controlled to vary, it is possible to reduce power consumption efficiently.

The controller may be configured to perform the first mode when an image displayed on the display is a still image, wherein the controller may be configured to perform the second mode when the image displayed on the display is a moving image. Accordingly, it is possible to reduce power consumption depending on an image.

An image display apparatus according to another embodiment of the present invention includes: a display including an organic light emitting diode (OLED) panel; and a power supply configured to supply power to the display, wherein the power supply comprises a converter including at least one switching element and configured to output DC power by converting a level of input power based on a switching operation of the at least one switching element, and wherein a first mode where the at least one switching element performs a switching operation continuously or a second mode where the switching operation of the at least one switching element stops the switching operation are performed according to an image displayed on the display. Accordingly, it is possible to reduce power consumption depending on an image. Accordingly, power consumption required to display an image may be reduced. In particular, since switching is performed a less number of times in the second mode than in the first mode, switching loss may be reduced and therefore power consumption may be reduced.

The controller may be configured to perform the second mode when a black area accounts for a predetermined percentage or more in the image displayed on the display. Accordingly, it is possible to reduce power consumption depending on an image.

The controller may be configured to increase duration of the second mode as a percentage of the black area in the image increases. Accordingly, as power consumption is controlled to vary, it is possible to reduce power consumption efficiently.

The controller may be configured to perform the first mode when the image displayed on the display is a still image, wherein the controller may be configured to perform the second mode when the image displayed on the display is a moving image. Accordingly, it is possible to reduce power consumption depending on an image.

BRIEF DESCRIPTION OF THE DRAWINGS

The embodiments will be described in detail with reference to the following drawings in which like reference numerals refer to like elements wherein.

DETAILED DESCRIPTION OF THE PREFERRED EMBODIMENTS

Hereinafter, the present invention will be described in detail with reference to the accompanying drawings.

With respect to constituent elements used in the following description, suffixes "module" and "unit" are given only in consideration of ease in the preparation of the specification, and do not have or serve as different meanings. Accordingly, the suffixes "module" and "unit" may be used interchangeably.

Figure 1:
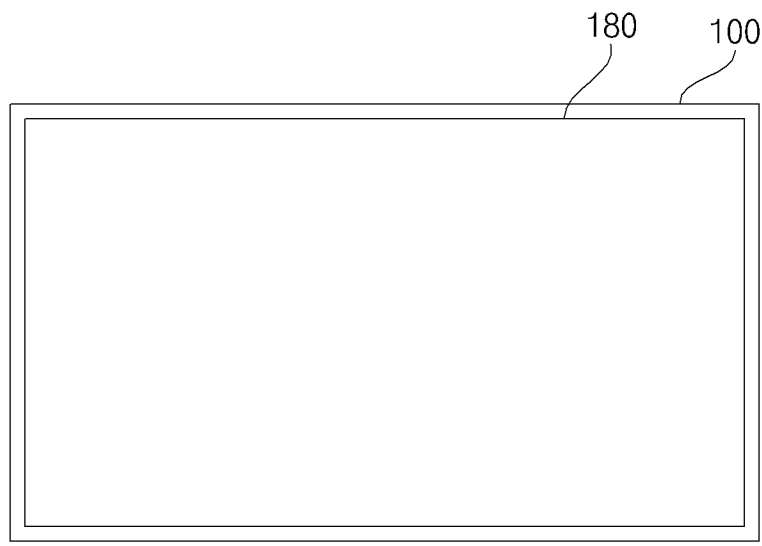
FIG. 1 is a diagram illustrating an image display apparatus according to an embodiment of the present invention.

FIG. 1 is a diagram illustrating an image display apparatus according to an embodiment of the present invention.

Referring to the drawing, an image display apparatus 100 may include a display 180.

Meanwhile, the display 180 may be implemented with any one of various panels. For example, the display 180 may be any one of a liquid crystal display panel (LCD panel), an organic light emitting diode panel (OLED panel), an inorganic light emitting diode panel (LED panel).

Meanwhile, a description about an example in which the display 180 includes an OLED panel will be hereinafter provided.

An image display apparatus according to an embodiment of the present invention may include the display 180 including an OLED panel 210.

With the trend that the display 180 increases in size, the larger the display 180, the more the power consumption by the display 180.

The present invention proposes a method for reducing power consumption according to an image displayed on the display 180 or depending on load on an output terminal of a converter that supplies power to the display 180.

To this end, the image display apparatus 100 according to an embodiment of the present invention includes the display 180, and a power supply 190 supplying power to the display 180. The power supply 190 includes at least switching element Sa or Sb, and a converter 700 configured to output direct current (DC) power Vdc by converting a level of input power based on a switching operation of the at least one switching element Sa or Sb. A first mode where the at least one switching element Sa or Sb performs a switching operation of continuously, and a second mode where the at least one switching element Sa or Sb stop the switching operation may be implemented selectively according to a load 900 at an output terminal nc-nd of the converter 700. Accordingly, power consumption required to display an image may be reduced. In particular, in the second mode, switching is performed a less number of times than in the first mode, thereby reducing switching losses and hence reducing power consumption.

Meanwhile, an image display apparatus 100 according to another embodiment of the present invention includes a display 180 including an OLED panel, and a power supply 190 supplying power to the display 180. The power supply 190 includes a converter 700 including at least one switching element Sa or Sb and configured to output DC power Vdc by converting a level of input power based on a switching operation of the at least one switching element Sa or Sb, and a first mode where the at least one switching element Sa or Sb performs a switching operation continuously or a second mode where the at least one switching element Sa or Sb stops the switching operation may be implemented selectively according to an image displayed on the display 180. Accordingly, power consumption according to an image may be reduced. In particular, in the second mode, switching is performed a less number of times than in the first mode, thereby reducing switching losses and hence reducing power consumption.

Various operation methods of the image display apparatus 100 according to the embodiment of the present invention will be described in more detail with reference to FIG. 9.

Meanwhile, the image display apparatus 100 of FIG. 1 may be a TV, a monitor, a tablet PC, a mobile terminal, a display for a vehicle, or the like.

Figure 2:
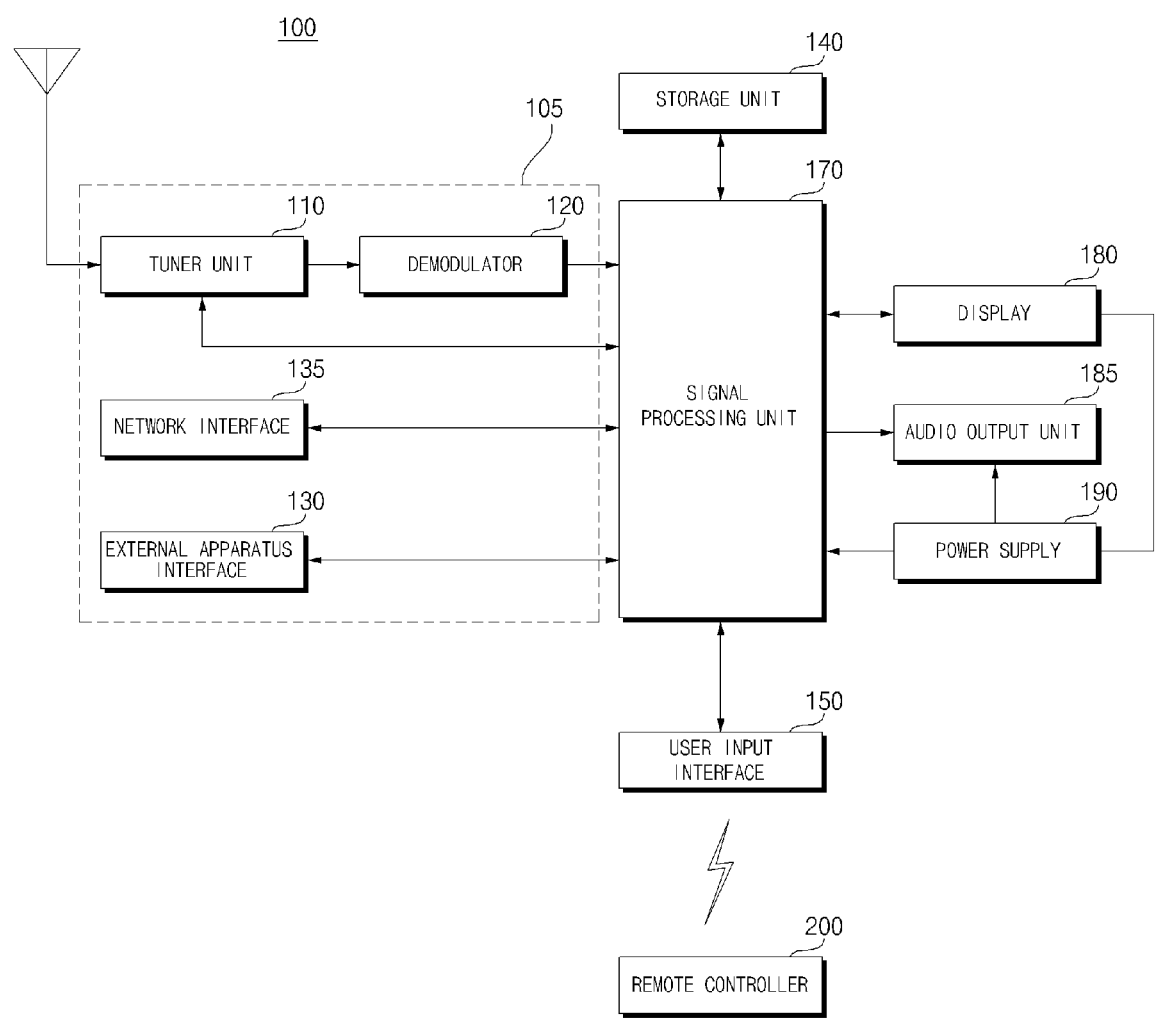
FIG. 2 is an example of an internal block diagram of the image display apparatus of FIG. 1.

FIG. 2 is an example of an internal block diagram of the image display apparatus of FIG. 1.

Referring to FIG. 2, the image display apparatus 100 according to an embodiment of the present invention includes a broadcast receiving unit 105, a storage unit 140, a user input interface 150, a sensor unit (not shown), a controller 170, a display 180, and an audio output unit 185.

The broadcast receiving unit 105 may include a tuner unit 110, a demodulator 120, a network interface 135, and an external apparatus interface 130.

Meanwhile, unlike the drawing, the broadcast receiving unit 105 may include only the tuner unit 110, the demodulator 120, and the external apparatus interface 130. That is, the network interface 135 may not be included.

The tuner unit 110 selects an RF broadcast signal corresponding to a channel selected by a user or all pre-stored channels among radio frequency (RF) broadcast signals received through an antenna (not shown). In addition, the selected RF broadcast signal is converted into an intermediate frequency signal, a baseband image, or a audio signal.

For example, if the selected RF broadcast signal is a digital broadcast signal, it is converted into a digital IF signal (DIF). If the selected RF broadcast signal is an analog broadcast signal, it is converted into an analog baseband image or audio signal (CVBS/SIF). That is, the tuner unit 110 can process a digital broadcast signal or an analog broadcast signal. The analog baseband image or audio signal (CVBS/SIF) output from the tuner unit 110 may be directly input to the controller 170.

Meanwhile, the tuner unit 110 can include a plurality of tuners for receiving broadcast signals of a plurality of channels. Alternatively, a single tuner that simultaneously receives broadcast signals of a plurality of channels is also available.

The demodulator 120 receives the converted digital IF signal DIF from the tuner unit 110 and performs a demodulation operation.

The demodulator 120 may perform demodulation and channel decoding and then output a stream signal TS. At this time, the stream signal may be a multiplexed signal of an image signal, a audio signal, or a data signal.

The stream signal output from the demodulator 120 may be input to the controller 170. The controller 170 performs demultiplexing, image/audio signal processing, and the like, and then outputs an image to the display 180 and outputs audio to the audio output unit 185.

The external apparatus interface 130 may transmit or receive data with a connected external apparatus (not shown), e.g., a set-top box 50. To this end, the external apparatus interface 130 may include an A/V input and output unit (not shown).

The external apparatus interface 130 may be connected in wired or wirelessly to an external apparatus such as a digital versatile disk (DVD), a Blu ray, a game equipment, a camera, a camcorder, a computer (note book), and a set-top box, and may perform an input/output operation with an external apparatus.

The A/V input and output unit may receive image and audio signals from an external apparatus. Meanwhile, a wireless communication unit (not shown) may perform short-range wireless communication with other electronic apparatus.

Through the wireless communication unit (not shown), the external apparatus interface 130 may exchange data with an adjacent mobile terminal 600. In particular, in a mirroring mode, the external apparatus interface 130 may receive device information, executed application information, application image, and the like from the mobile terminal 600.

The network interface 135 provides an interface for connecting the image display apparatus 100 to a wired/wireless network including the Internet network. For example, the network interface 135 may receive, via the network, content or data provided by the Internet, a content provider, or a network operator.

Meanwhile, the network interface 135 may include a wireless communication unit (not shown).

The storage unit 140 may store a program for each signal processing and control in the controller 170, and may store signal-processed image, audio, or data signal.

In addition, the storage unit 140 may serve to temporarily store image, audio, or data signal input to the external apparatus interface 130. In addition, the storage unit 140 may store information on a certain broadcast channel through a channel memory function such as a channel map.

Although FIG. 2 illustrates that the storage unit is provided separately from the controller 170, the scope of the present invention is not limited thereto. The storage unit 140 may be included in the controller 170.

The user input interface 150 transmits a signal input by the user to the controller 170 or transmits a signal from the controller 170 to the user.

For example, it may transmit/receive a user input signal such as power on/off, channel selection, screen setting, etc., from a remote controller 200, may transfer a user input signal input from a local key (not shown) such as a power key, a channel key, a volume key, a set value, etc., to the controller 170, may transfer a user input signal input from a sensor unit (not shown) that senses a user's gesture to the controller 170, or may transmit a signal from the controller 170 to the sensor unit (not shown).

The controller 170 may demultiplex the input stream through the tuner unit 110, the demodulator 120, the network interface 135, or the external apparatus interface 130, or process the demultiplexed signals to generate and output a signal for image or audio output.

The image signal processed by the controller 170 is input to the display 180, and may be displayed as an image corresponding to the image signal. In addition, the image signal processed by the controller 170 may be input to the external output apparatus through the external apparatus interface 130.

The audio signal processed by the controller 170 may be output to the audio output unit 185 as an audio signal. In addition, audio signal processed by the controller 170 may be input to the external output apparatus through the external apparatus interface 130.

Although not shown in FIG. 2, the controller 170 may include a demultiplexer, an image processor, and the like. This will be described later with reference to FIG. 3.

In addition, the controller 170 can control the overall operation of the image display apparatus 100. For example, the controller 170 may control the tuner unit 110 to control the tuning of the RF broadcast corresponding to the channel selected by the user or the previously stored channel.

In addition, the controller 170 may control the image display apparatus 100 according to a user command input through the user input interface 150 or an internal program.

Meanwhile, the controller 170 may control the display 180 to display an image. At this time, the image displayed on the display 180 may be a still image or a moving image, and may be a 2D image or a 3D image.

Meanwhile, the controller 170 may display a certain object in an image displayed on the display 180. For example, the object may be at least one of a connected web screen (newspaper, magazine, etc.), an electronic program guide (EPG), various menus, a widget, an icon, a still image, a moving image, and a text.

Meanwhile, the controller 170 may recognize the position of the user based on the image photographed by a photographing unit (not shown). For example, the distance (z-axis coordinate) between a user and the image display apparatus 100 can be determined. In addition, the x-axis coordinate and the y-axis coordinate in the display 180 corresponding to a user position can be determined.

The display 180 generates a driving signal by converting an image signal, a data signal, an OSD signal, a control signal processed by the controller 170, an image signal, a data signal, a control signal, and the like received from the external apparatus interface 130.

Meanwhile, the display 180 may be configured as a touch screen and used as an input device in addition to an output device.

The audio output unit 185 receives a signal processed by the controller 170 and outputs it as an audio.

The photographing unit (not shown) photographs a user. The photographing unit (not shown) may be implemented by a single camera, but the present invention is not limited thereto and may be implemented by a plurality of cameras. Image information photographed by the photographing unit (not shown) may be input to the controller 170.

The controller 170 may sense a gesture of the user based on each of the images photographed by the photographing unit (not shown), the signals detected from the sensor unit (not shown), or a combination thereof.

The power supply 190 supplies corresponding power to the image display apparatus 100. Particularly, the power may be supplied to a controller 170 which can be implemented in the form of a system on chip (SOC), a display 180 for displaying an image, and an audio output unit 185 for outputting an audio.

Specifically, the power supply 190 may include a converter for converting an AC power into a DC power, and a DC/DC converter for converting the level of the DC power.

The remote controller 200 transmits the user input to the user input interface 150. To this end, the remote controller 200 may use Bluetooth, a radio frequency (RF) communication, an infrared (IR) communication, an Ultra Wideband (UWB), ZigBee, or the like. In addition, the remote controller 200 may receive the image, audio, or data signal output from the user input interface 150, and display it on the remote controller 200 or output it as an audio.

Meanwhile, the image display apparatus 100 may be a fixed or mobile digital broadcasting receiver capable of receiving digital broadcasting.

Meanwhile, a block diagram of the image display apparatus 100 shown in FIG. 2 is a block diagram for an embodiment of the present invention. Each component of the block diagram may be integrated, added, or omitted according to a specification of the image display apparatus 100 actually implemented. That is, two or more components may be combined into a single component as needed, or a single component may be divided into two or more components. The function performed in each block is described for the purpose of illustrating embodiments of the present invention, and specific operation and apparatus do not limit the scope of the present invention.

Figure 3:
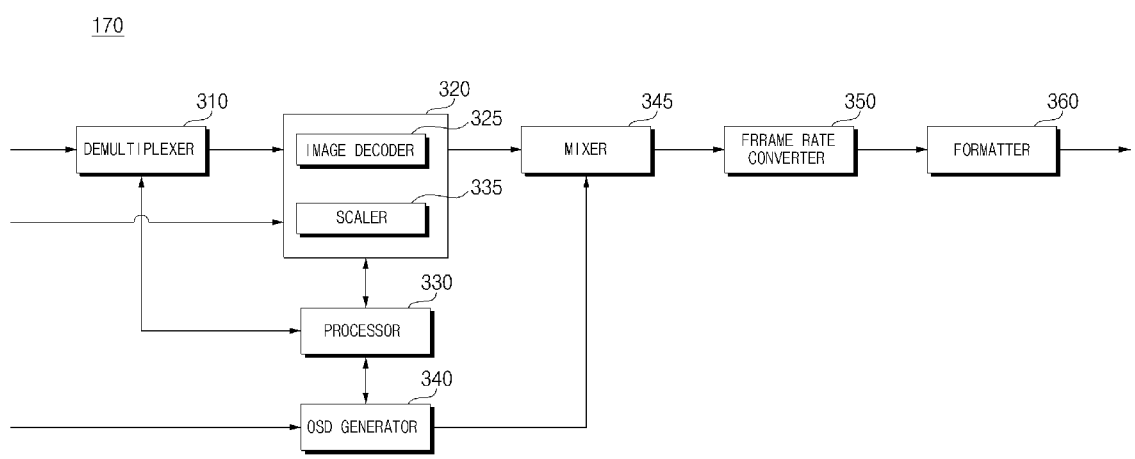
FIG. 3 is an example of an internal block diagram of a controller of FIG. 2.

FIG. 3 is an example of an internal block diagram of a controller of FIG. 2.

Referring to the drawing, the controller 170 according to an embodiment of the present invention may include a demultiplexer 310, an image processing unit 320, a processor 330, an OSD generator 340, a mixer 345, a frame rate converter 350, and a formatter 360. In addition, it may further include an audio processing unit (not shown), and a data processing unit (not shown).

The demultiplexer 310 demultiplexes the input stream. For example, when an MPEG-2 TS is input, it can be demultiplexed into image, audio, and data signal, respectively. Here, the stream signal input to the demultiplexer 310 may be a stream signal output from the tuner unit 110, the demodulator 120, or the external apparatus interface 130.

The image processing unit 320 may perform image processing of the demultiplexed image signal. To this end, the image processing unit 320 may include an image decoder 325 and a scaler 335.

The image decoder 325 decodes the demultiplexed image signal, and the scaler 335 performs scaling so that the resolution of the decoded image signal can be output from the display 180.

The image decoder 325 can include a decoder of various standards. For example, a 3D image decoder for MPEG-2, H.264 decoder, a color image, and a depth image, and a decoder for a multiple view image may be provided.

The processor 330 may control the overall operation of the image display apparatus 100 or the controller 170. For example, the processor 330 may control the tuner 110 to accomplish the tuning of an RF broadcast corresponding to a channel selected by the user or a previously stored channel.

In addition, the processor 330 may control the image display apparatus 100 by a user command input through the user input interface 150 or an internal program.

In addition, the processor 330 may perform a control of data transmission with the network interface 135 or the external apparatus interface 130.

In addition, the processor 330 may control operations of the demultiplexing unit 310, the image processing unit 320, the OSD generator 340, and the like in the controller 170.

The OSD generator 340 generates an OSD signal according to a user input or by itself. For example, based on a user input signal, the OSD generator 340 may generate a signal for displaying various information as a graphic or a text on the screen of the display 180. The generated OSD signal may include various data such as a user interface screen of the image display apparatus 100, various menu screens, a widget, and an icon. In addition, the generated OSD signal may include a 2D object or a 3D object.

In addition, the OSD generator 340 may generate a pointer that can be displayed on the display, based on a pointing signal input from the remote controller 200. In particular, such a pointer may be generated by a pointing signal processing unit, and the OSD generator 340 may include such a pointing signal processing unit (not shown). Obviously, the pointing signal processing unit (not shown) may be provided separately from the OSD generator 340.

The mixer 345 may mix an OSD signal generated by the OSD generator 340 with a decoded image signal image-processed by the image processing unit 320. The mixed image signal is supplied to the frame rate converter 350.

The frame rate converter (FRC) 350 may convert the frame rate of an input image. Meanwhile, the frame rate converter 350 can also directly output the frame rate without any additional frame rate conversion.

Meanwhile, the formatter 360 may convert the format of an input image signal into a image signal for display on the display and output it.

The formatter 360 may change the format of the image signal. For example, it may change the format of the 3D image signal into any one of various 3D formats such as a side by side format, a top/down format, a frame sequential format, an interlaced format, a checker box format, and the like.

Meanwhile, the audio processing unit (not shown) in the controller 170 may perform the audio processing of the demultiplexed audio signal. To this end, the audio processing unit (not shown) may include various decoders.

In addition, the audio processing unit (not shown) in the controller 170 may process a base, a treble, a volume control, and the like.

The data processing unit (not shown) in the controller 170 may perform data processing of the demultiplexed data signal. For example, when the demultiplexed data signal is a coded data signal, it can be decoded. The encoded data signal may be electronic program guide information including broadcast information such as a start time and an end time of a broadcast program broadcasted on each channel.

Meanwhile, a block diagram of the controller 170 shown in FIG. 3 is a block diagram for an embodiment of the present invention. Each component of the block diagram may be integrated, added, or omitted according to a specification of the controller 170 actually implemented.

In particular, the frame rate converter 350 and the formatter 360 may not be provided in the controller 170, but may be separately provided or may be provided as a separate single module.

Figure 4A:
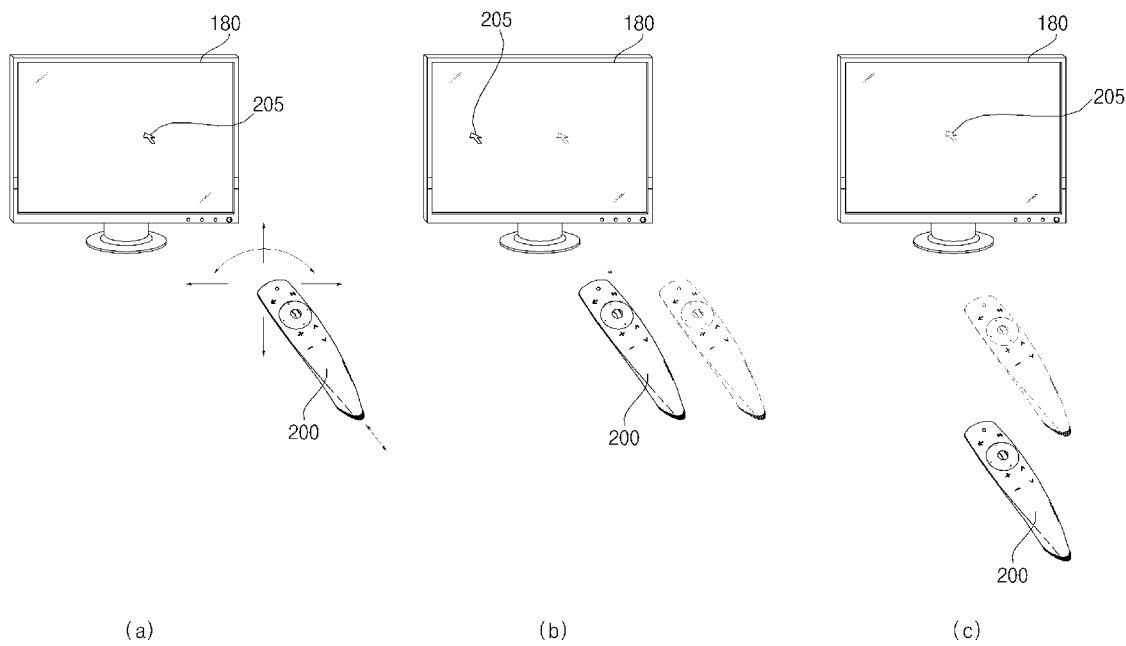
FIG. 4A is a diagram illustrating a control method of a remote controller of FIG. 2.

FIG. 4A is a diagram illustrating a control method of a remote controller of FIG. 2.

As shown in FIG. 4A(a), it is illustrated that a pointer 205 corresponding to the remote controller 200 is displayed on the display 180.

The user may move or rotate the remote controller 200 up and down, left and right (FIG. 4A(b)), and back and forth (FIG. 4A(c)). The pointer 205 displayed on the display 180 of the image display apparatus corresponds to the motion of the remote controller 200. Such a remote controller 200 may be referred to as a space remote controller or a 3D pointing apparatus, because the pointer 205 is moved and displayed according to the movement in a 3D space, as shown in the drawing.

FIG. 4A(b) illustrates that when the user moves the remote controller 200 to the left, the pointer 205 displayed on the display 180 of the image display apparatus also moves to the left correspondingly.

Information on the motion of the remote controller 200 detected through a sensor of the remote controller 200 is transmitted to the image display apparatus. The image display apparatus may calculate the coordinate of the pointer 205 from the information on the motion of the remote controller 200. The image display apparatus may display the pointer 205 to correspond to the calculated coordinate.

FIG. 4A(c) illustrates a case where the user moves the remote controller 200 away from the display 180 while pressing a specific button of the remote controller 200. Thus, a selection area within the display 180 corresponding to the pointer 205 may be zoomed in so that it can be displayed to be enlarged. On the other hand, when the user moves the remote controller 200 close to the display 180, the selection area within the display 180 corresponding to the pointer 205 may be zoomed out so that it can be displayed to be reduced. Meanwhile, when the remote controller 200 moves away from the display 180, the selection area may be zoomed out, and when the remote controller 200 approaches the display 180, the selection area may be zoomed in.

Meanwhile, when the specific button of the remote controller 200 is pressed, it is possible to exclude the recognition of vertical and lateral movement. That is, when the remote controller 200 moves away from or approaches the display 180, the up, down, left, and right movements are not recognized, and only the forward and backward movements are recognized. Only the pointer 205 is moved according to the up, down, left, and right movements of the remote controller 200 in a state where the specific button of the remote controller 200 is not pressed.

Meanwhile, the moving speed or the moving direction of the pointer 205 may correspond to the moving speed or the moving direction of the remote controller 200.

Figure 4B:
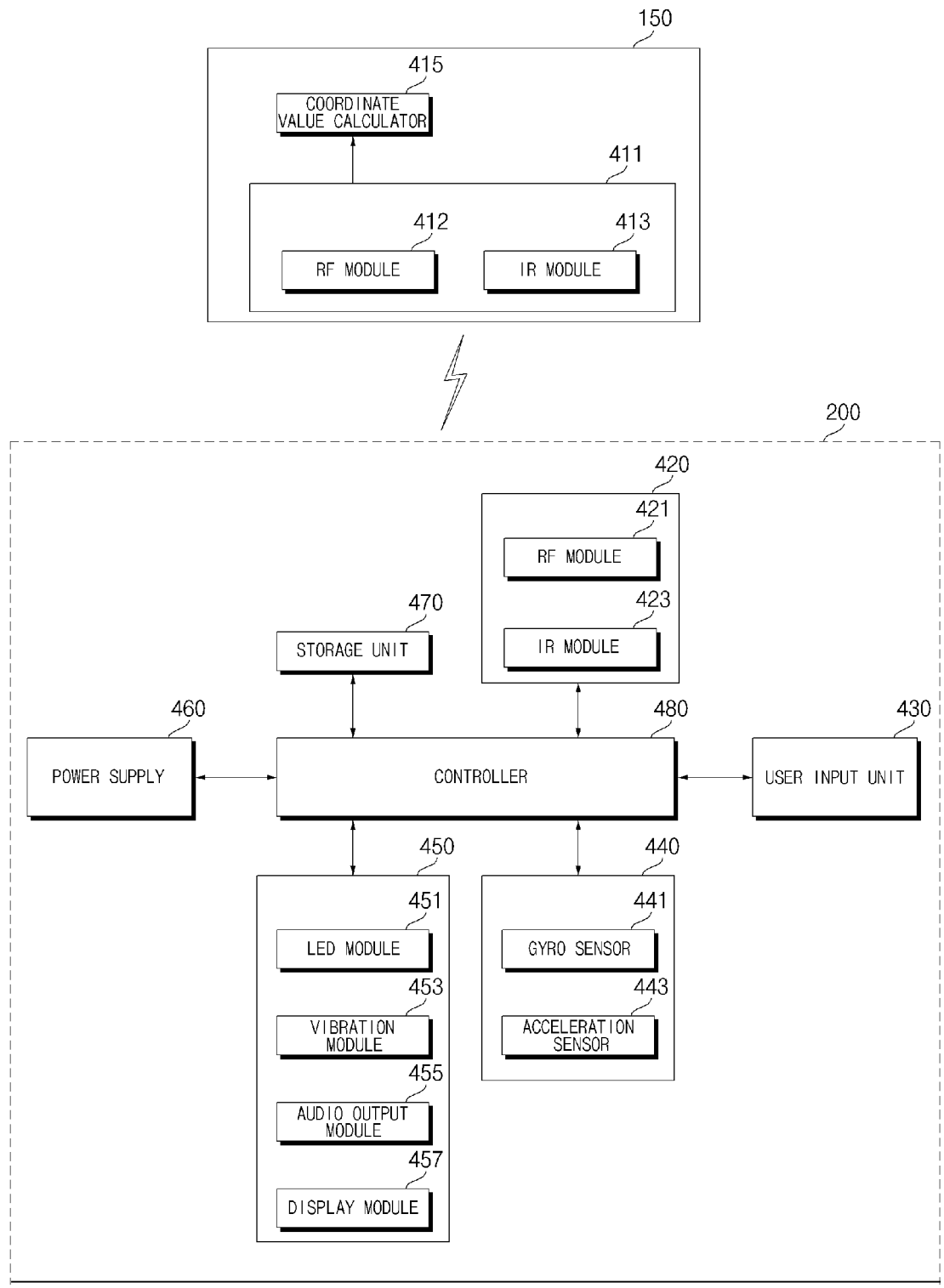
FIG. 4B is an internal block diagram of the remote controller of FIG. 2.

FIG. 4B is an internal block diagram of the remote controller of FIG. 2.

Referring to the drawing, the remote controller 200 includes a wireless communication unit 425, a user input unit 435, a sensor unit 440, an output unit 450, a power supply 460, a storage unit 470, and a controller 480.

The wireless communication unit 425 transmits/receives a signal to/from any one of the image display apparatuses according to the embodiments of the present invention described above. Among the image display apparatuses according to the embodiments of the present invention, one image display apparatus 100 will be described as an example.

In the present embodiment, the remote controller 200 may include an RF module 421 for transmitting and receiving signals to and from the image display apparatus 100 according to a RF communication standard. In addition, the remote controller 200 may include an IR module 423 for transmitting and receiving signals to and from the image display apparatus 100 according to a IR communication standard.

In the present embodiment, the remote controller 200 transmits a signal containing information on the motion of the remote controller 200 to the image display apparatus 100 through the RF module 421.

In addition, the remote controller 200 may receive the signal transmitted by the image display apparatus 100 through the RF module 421. In addition, if necessary, the remote controller 200 may transmit a command related to power on/off, channel change, volume change, and the like to the image display apparatus 100 through the IR module 423.

The user input unit 435 may be implemented by a keypad, a button, a touch pad, a touch screen, or the like. The user may operate the user input unit 435 to input a command related to the image display apparatus 100 to the remote controller 200. When the user input unit 435 includes a hard key button, the user can input a command related to the image display apparatus 100 to the remote controller 200 through a push operation of the hard key button. When the user input unit 435 includes a touch screen, the user may touch a soft key of the touch screen to input the command related to the image display apparatus 100 to the remote controller 200. In addition, the user input unit 435 may include various types of input means such as a scroll key, a jog key, etc., which can be operated by the user, and the present invention does not limit the scope of the present invention.

The sensor unit 440 may include a gyro sensor 441 or an acceleration sensor 443. The gyro sensor 441 may sense information about the motion of the remote controller 200.

For example, the gyro sensor 441 may sense information on the operation of the remote controller 200 based on the x, y, and z axes. The acceleration sensor 443 may sense information on the moving speed of the remote controller 200. Meanwhile, a distance measuring sensor may be further provided, and thus, the distance to the display 180 may be sensed.

The output unit 450 may output an image or an audio signal corresponding to the operation of the user input unit 435 or a signal transmitted from the image display apparatus 100. Through the output unit 450, the user may recognize whether the user input unit 435 is operated or whether the image display apparatus 100 is controlled.

For example, the output unit 450 may include an LED module 451 that is turned on when the user input unit 435 is operated or a signal is transmitted/received to/from the image display apparatus 100 through the wireless communication unit 425, a vibration module 453 for generating a vibration, an audio output module 455 for outputting an audio, or a display module 457 for outputting an image.

The power supply 460 supplies power to the remote controller 200. When the remote controller 200 is not moved for a certain time, the power supply 460 may stop the supply of power to reduce a power waste. The power supply 460 may resume power supply when a certain key provided in the remote controller 200 is operated.

The storage unit 470 may store various types of programs, application data, and the like necessary for the control or operation of the remote controller 200. If the remote controller 200 wirelessly transmits and receives a signal to/from the image display apparatus 100 through the RF module 421, the remote controller 200 and the image display apparatus 100 transmit and receive a signal through a certain frequency band. The controller 480 of the remote controller 200 may store information about a frequency band or the like for wirelessly transmitting and receiving a signal to/from the image display apparatus 100 paired with the remote controller 200 in the storage unit 470 and may refer to the stored information.

The controller 480 controls various matters related to the control of the remote controller 200. The controller 480 may transmit a signal corresponding to a certain key operation of the user input unit 435 or a signal corresponding to the motion of the remote controller 200 sensed by the sensor unit 440 to the image display apparatus 100 through the wireless communication unit 425.

The user input interface 150 of the image display apparatus 100 includes a wireless communication unit 151 that can wirelessly transmit and receive a signal to and from the remote controller 200 and a coordinate value calculator 415 that can calculate the coordinate value of a pointer corresponding to the operation of the remote controller 200.

The user input interface 150 may wirelessly transmit and receive a signal to and from the remote controller 200 through the RF module 412. In addition, the user input interface 150 may receive a signal transmitted by the remote controller 200 through the IR module 413 according to a IR communication standard.

The coordinate value calculator 415 may correct a hand shake or an error from a signal corresponding to the operation of the remote controller 200 received through the wireless communication unit 151 and calculate the coordinate value (x, y) of the pointer 205 to be displayed on the display 180.

The transmission signal of the remote controller 200 inputted to the image display apparatus 100 through the user input interface 150 is transmitted to the controller 180 of the image display apparatus 100. The controller 180 may determine the information on the operation of the remote controller 200 and the key operation from the signal transmitted from the remote controller 200, and, correspondingly, control the image display apparatus 100.

For another example, the remote controller 200 may calculate the pointer coordinate value corresponding to the operation and output it to the user input interface 150 of the image display apparatus 100. In this case, the user input interface 150 of the image display apparatus 100 may transmit information on the received pointer coordinate value to the controller 180 without a separate correction process of hand shake or error.

For another example, unlike the drawing, the coordinate value calculator 415 may be provided in the controller 170, not in the user input interface 150.

Figure 5:
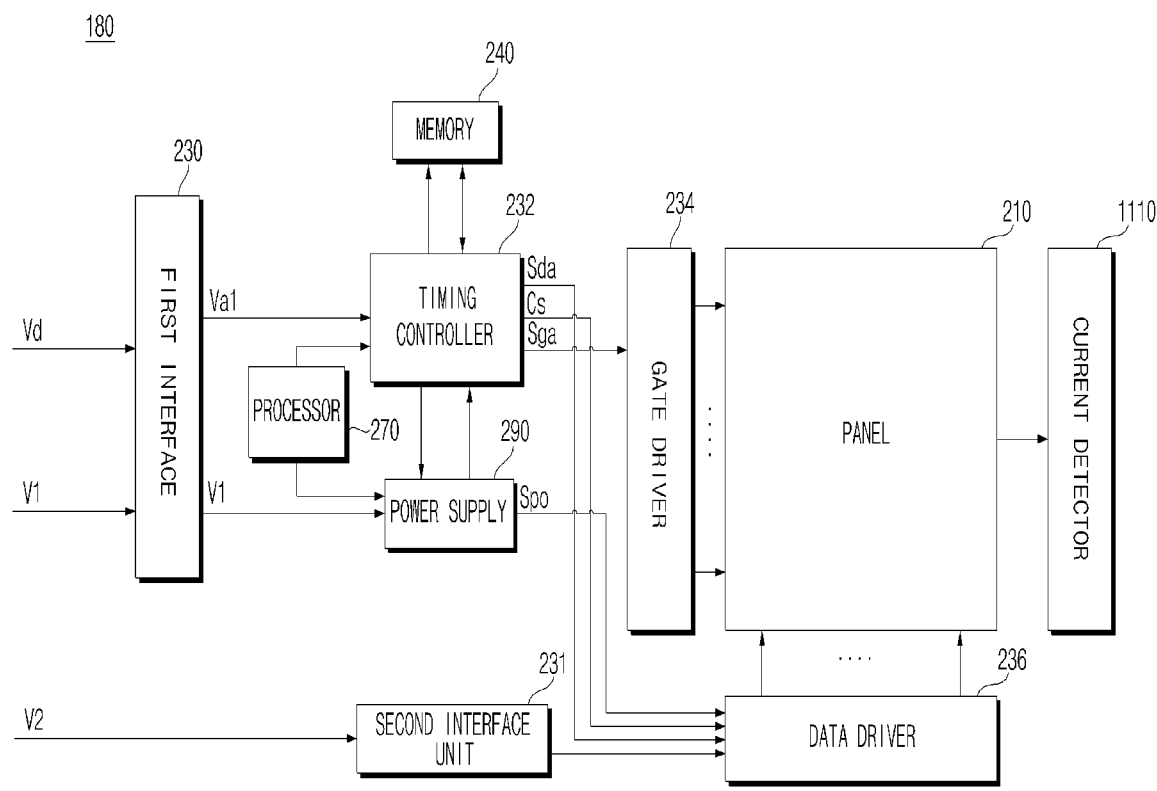
FIG. 5 is an internal block diagram of a display of FIG. 2.

FIG. 5 is an internal block diagram of a display of FIG. 2.

Referring to FIG. 5, the organic light emitting diode panel-based display 180 may include an organic light emitting diode panel 210, a first interface 230, a second interface 231, a timing controller 232, a gate driver 234, a data driver 236, a memory 240, a processor 270, a power supply 290, a current detector 1110, and the like.

The display 180 receives an image signal Vd, a first DC power V1, and a second DC power V2, and may display a certain image based on the image signal Vd.

Meanwhile, the first interface 230 in the display 180 may receive the image signal Vd and the first DC power V1 from the controller 170.

Here, the first DC power V1 may be used for the operation of the power supply 290 and the timing controller 232 in the display 180.

Next, the second interface 231 may receive a second DC power V2 from an external power supply 190. Meanwhile, the second DC power V2 may be input to the data driver 236 in the display 180.

The timing controller 232 may output a data driving signal Sda and a gate driving signal Sga, based on the image signal Vd.

For example, when the first interface 230 converts the input image signal Vd and outputs the converted image signal va1, the timing controller 232 may output the data driving signal Sda and the gate driving signal Sga based on the converted image signal va1.

The timing controller 232 may further receive a control signal, a vertical synchronization signal Vsync, and the like, in addition to the image signal Vd from the controller 170.

In addition to the image signal Vd, based on a control signal, a vertical synchronization signal Vsync, and the like, the timing controller 232 generates a gate driving signal Sga for the operation of the gate driver 234, and a data driving signal Sda for the operation of the data driver 236.

Meanwhile, the timing controller 232 may further output a control signal Cs to the gate driver 234.

The gate driver 234 and the data driver 236 supply a scan signal and an image signal to the organic light emitting diode panel 210 through a gate line GL and a data line DL respectively, according to the gate driving signal Sga and the data driving signal Sda from the timing controller 232. Accordingly, the organic light emitting diode panel 210 displays a certain image.

Meanwhile, the organic light emitting diode panel 210 may include an organic light emitting layer. In order to display an image, a plurality of gate lines GL and data lines DL may be disposed in a matrix form in each pixel corresponding to the organic light emitting layer.

Meanwhile, the data driver 236 may output a data signal to the organic light emitting diode panel 210 based on a second DC power V2 from the second interface 231.

The power supply 290 may supply various power supplies to the gate driver 234, the data driver 236, the timing controller 232, and the like.

The current detector 1110 may detect the current flowing in a sub-pixel of the organic light emitting diode panel 210. The detected current may be input to the processor 270 or the like, for a cumulative current calculation.

The processor 270 may perform each type of control of the display 180. For example, the processor 270 may control the gate driver 234, the data driver 236, the timing controller 232, and the like.

Meanwhile, the processor 270 may receive current information flowing in a sub-pixel of the organic light emitting diode panel 210 from the current detector 1110.

In addition, the processor 270 may calculate the accumulated current of each subpixel of the organic light emitting diode panel 210, based on information of current flowing through the subpixel of the organic light emitting diode panel 210. The calculated accumulated current may be stored in the memory 240.

Meanwhile, the processor 270 may determine as burn-in, if the accumulated current of each sub-pixel of the organic light emitting diode panel 210 is equal to or greater than an allowable value.

For example, if the accumulated current of each subpixel of the OLED panel 210 is equal to or greater than 300000 A, the processor 270 may determine that a corresponding subpixel is a subpixel which has been burn in.

Meanwhile, if accumulated current of some of subpixels of the OLED panel 210 is close to the allowable value, the processor 270 may determine that the corresponding subpixel is a subpixel expected to be burn in.

Meanwhile, based on a current detected by the current detector 1110, the processor 270 may determine that a subpixel including the greatest accumulated current is an expected burn-in subpixel.

Meanwhile, the processor 270 may calculate a burn-in subpixel or an expected burn-in subpixel in the OLED panel 210 based on a current detected by the current detector 1110, and then the processor 270 may perform control such that a current lower than an allocated current flows in a subpixel in the surroundings of the burn-in subpixel or the expected burn-in subpixel. Accordingly, it is possible to extend the burn-in phenomenon of the subpixel in the surroundings of the burn-in subpixel. As a result, this may extend the lifetime of the image display apparatus 100 including the OLED panel 210.

Meanwhile, the processor 270 may perform control such that a current higher than an allocated current flows in the calculated burn-in subpixel, and, as a result, a low current flows in the surroundings of the calculated burn-in subpixel, thereby preventing illuminance reduction.

Meanwhile, if burn-in does not happen in the OLED panel 210, the processor 270 may perform control such that a current lower than an allocated current flows in a subpixel in the surroundings of an expected burn-in subpixel, so that burn-in may last further in the subpixel in the surroundings of the expected burn-in subpixel. As a result, the life of the image display apparatus 100 including the OLED panel 210 may increase.

Meanwhile, the processor 270 may perform control such that a data voltage lower than an allocated data voltage is applied to a subpixel in the surroundings of the calculated burn-in subpixel or the expected burn-in subpixel.

Meanwhile, if burn-in does not happen in the OLED panel 210, the processor 270 may perform control such that a current lower than an allocated current flows even in the expected burn-in subpixel, so that the burn-in may last further in the burn-in expected subpixel. As a result, the life time of the image display apparatus 100 including the OLED panel 210 may increase.

Meanwhile, the processor 270 may perform control such that a current of a second level higher than a first level flows in a second subpixel farther than a first subpixel among subpixels in the surroundings of a calculated burn-in subpixel or a calculated expected burn-in subpixel. Accordingly, a higher current may flow in the second subpixel expected to have a longer lifetime, and therefore, it is possible to prevent luminance reduction.

Meanwhile, the processor 270 may calculate a subpixel including the greatest accumulated current in the OLED panel 210 based on a current detected by the current detector 1110, and perform control such that a current lower than an allocated current flows in subpixels in the surroundings of the subpixel including the greatest accumulated current. Accordingly, it is possible to extend the entire life time of the image display apparatus 100 including the OLED panel 210.

Meanwhile, the processor 270 may perform control such that a current of a lower level flows in subpixels in the surroundings of a subpixel including the greatest accumulated current. Accordingly, it is possible to extend the overall lifetime of the image display apparatus 100 including the OLED panel 210.

Figure 6A:
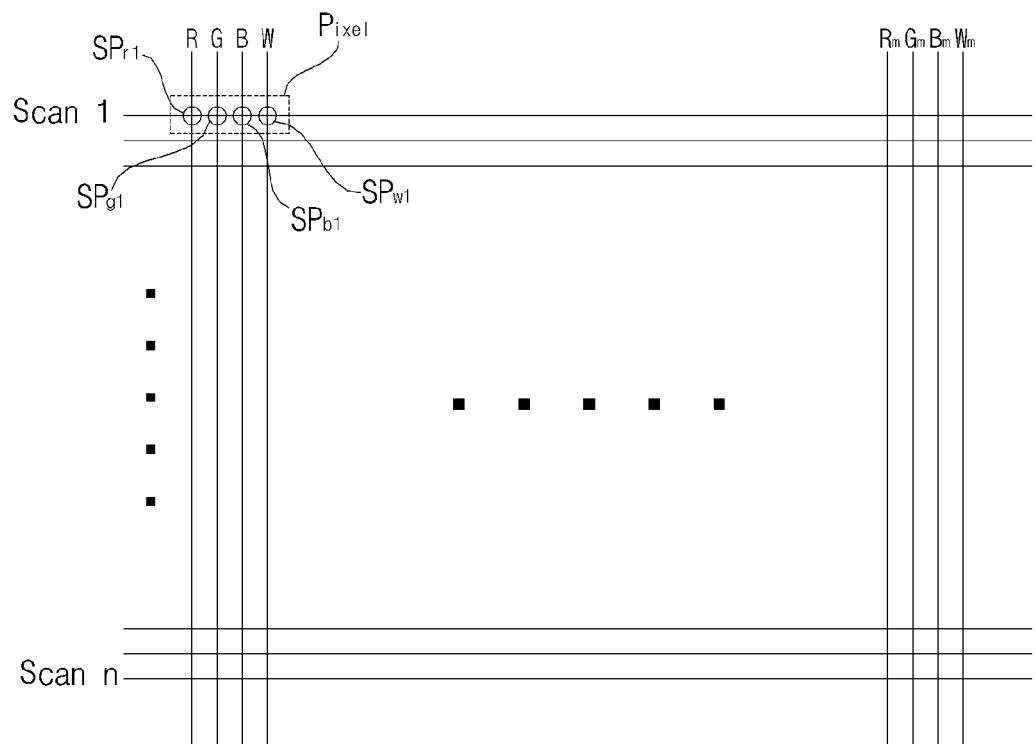
FIG. 6A and FIG. 6B are diagrams referred to in the description of an organic light emitting diode panel of FIG. 5.
Figure 6B:
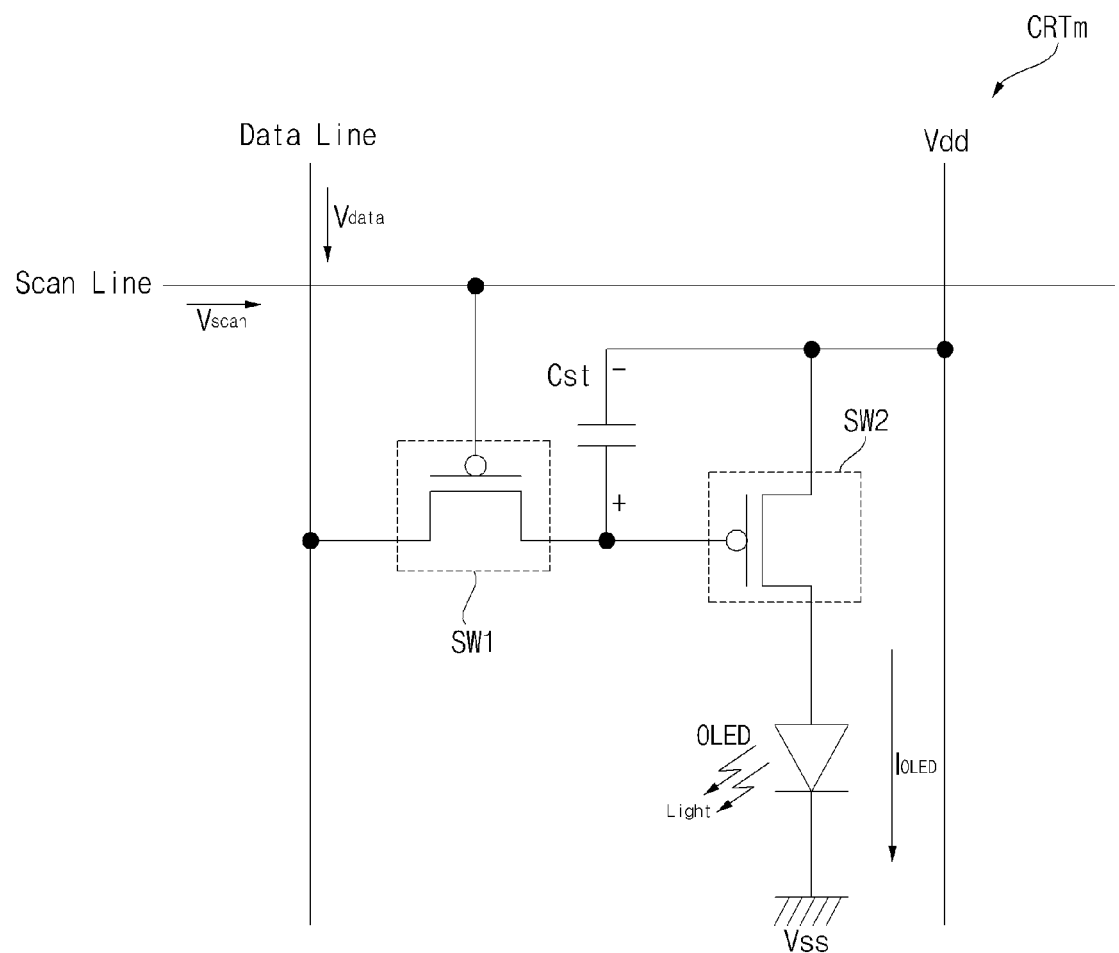

FIG. 6A and FIG. 6B are diagrams referred to in the description of an organic light emitting diode panel of FIG. 5.

Firstly, FIG. 6A is a diagram illustrating a pixel in the organic light emitting diode panel 210.

Referring to drawing, the organic light emitting diode panel 210 may include a plurality of scan lines Scan 1 to Scan n and a plurality of data lines R1, G1, B1, W1 to Rm, Gm, Bm, Wm intersecting the scan lines.

Meanwhile, a pixel (subpixel) is defined in an intersecting area of the scan line and the data line in the organic light emitting diode panel 210. In the drawing, a pixel including sub-pixels SR1, SG1, SB1 and SW1 of RGBW is shown.

FIG. 6B illustrates a circuit of any one sub-pixel in the pixel of the organic light emitting diode panel of FIG. 6A.

Referring to drawing, an organic light emitting sub pixel circuit (CRT) may include, as an active type, a switching transistor SW1, a storage capacitor Cst, a drive transistor SW2, and an organic light emitting layer (OLED).

Referring to drawing, an organic light emitting sub pixel circuit (CRT) may include, as an active type, a switching transistor SW1, a storage capacitor Cst, a drive transistor SW2, and an organic light emitting layer (OLED).

The storage capacitor Cst is formed between the gate terminal and the source terminal of the drive transistor SW2, and stores a certain difference between a data signal level transmitted to one end of the storage capacitor Cst and a DC power (VDD) level transmitted to the other terminal of the storage capacitor Cst.

For example, when the data signal has a different level according to a Plume Amplitude Modulation (PAM) method, the power level stored in the storage capacitor Cst varies according to the level difference of the data signal Vdata.

For another example, when the data signal has a different pulse width according to a Pulse Width Modulation (PWM) method, the power level stored in the storage capacitor Cst varies according to the pulse width difference of the data signal Vdata.

The drive transistor SW2 is turned on according to the power level stored in the storage capacitor Cst. When the drive transistor SW2 is turned on, the driving current (IOLED), which is proportional to the stored power level, flows in the organic light emitting layer (OLED). Accordingly, the organic light emitting layer OLED performs a light emitting operation.

The organic light emitting layer OLED may include a light emitting layer (EML) of RGBW corresponding to a subpixel, and may include at least one of a hole injecting layer (HIL), a hole transporting layer (HTL), an electron transporting layer (ETL), and an electron injecting layer (EIL). In addition, it may include a hole blocking layer, and the like.

Meanwhile, all the subpixels emit a white light in the organic light emitting layer OLED. However, in the case of green, red, and blue subpixels, a subpixel is provided with a separate color filter for color implementation. That is, in the case of green, red, and blue subpixels, each of the subpixels further includes green, red, and blue color filters. Meanwhile, since a white subpixel outputs a white light, a separate color filter is not required.

Meanwhile, in the drawing, it is illustrated that a p-type MOSFET is used for a switching transistor SW1 and a drive transistor SW2, but an n-type MOSFET or other switching element such as a JFET, IGBT, SIC, or the like are also available.

Meanwhile, the pixel is a hold-type element that continuously emits light in the organic light emitting layer (OLED), after a scan signal is applied, during a unit display period, specifically, during a unit frame.

Meanwhile, currents flow in the OLED disposed at each subpixel shown in FIG. 6D, thereby emitting light.

Figure 7:
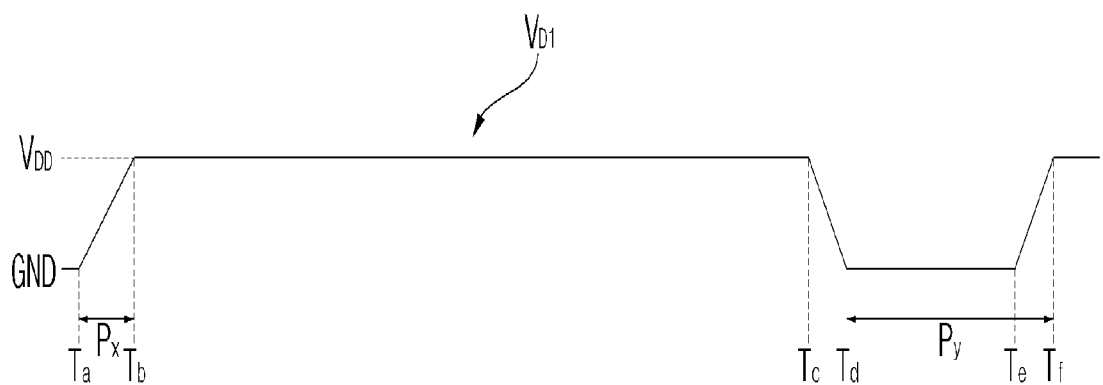
FIG. 7 is a diagram illustrating a voltage supplied to a display when AC power is supplied to a power supply.

FIG. 7 is a diagram illustrating a voltage supplied to a display when AC power is supplied to a power supply.

Referring to the drawing, when AC power is supplied to the power supply 190 at the time point of Ta, the operation power VDD is supplied to the panel 210 of the display 180 to be turned on, at a time point Tb, after a Px period.

Meanwhile, when the AC power supply is stopped at the time point Tc, the voltage applied to the panel 210 is lowered to the ground voltage GND at the time point Td.

Thereafter, when AC power is supplied again to the power supply 190 at the time point of Te, the voltage supplied to the panel 210 of the display 180 rises, and the operation power VDD is supplied to the panel 210 of the display 180 to be turned on at the time point of Tf.

At this time, it is preferable that the period from the time point Td to the time point Tf, or the period from the time point Tc to the time point Tf is equal to or longer than the minimum turn-on standby period so as to protect a panel.

Figure 8:
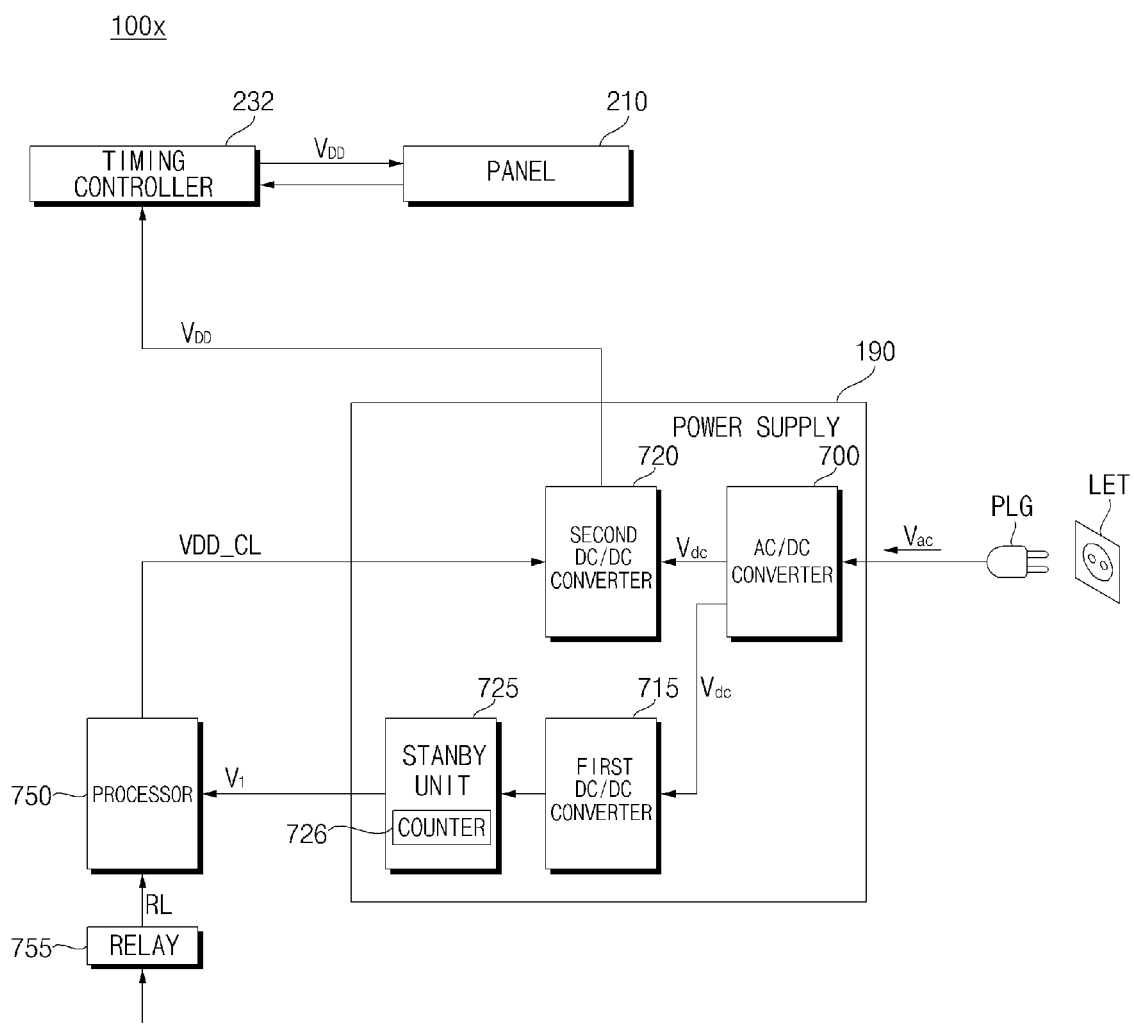
FIG. 8 is an example of an internal block diagram of an image display apparatus related to the present invention.

FIG. 8 is an example of an internal block diagram of an image display apparatus related to the present invention.

Referring to drawing, the image display apparatus 100 of FIG. 8 may include a power supply 190, a processor 750, a relay 755, a timing controller 232, and a panel 210.

When a plug PLG is connected to an outlet, the AC power Vac is supplied to the power supply 190. When the plug PLG is detached from the outlet, the AC power Vac is not supplied to the power supply 190.

The power supply 190 may include an AC/DC converter 710 for converting an AC power Vac into a DC power, a first DC/DC converter 715 for converting the level of the DC power, a second DC/DC converter 720, and a standby unit 725 for supplying standby power when the power is off.

Meanwhile, if a power-on signal is received from the remote controller 200, the relay 755 may operate and an operation signal RL may be input to the processor 750.

The processor 750 may operate by receiving operation power V1 from the power supply 190, and output a power control signal VDD_CL to the power supply 190.

The power supply 190 may output operation power VDD to the timing controller 232 in response to the power control signal VDD_CL, and the timing controller 232 may output the operation power VDD to the panel 210.

Figure 9:
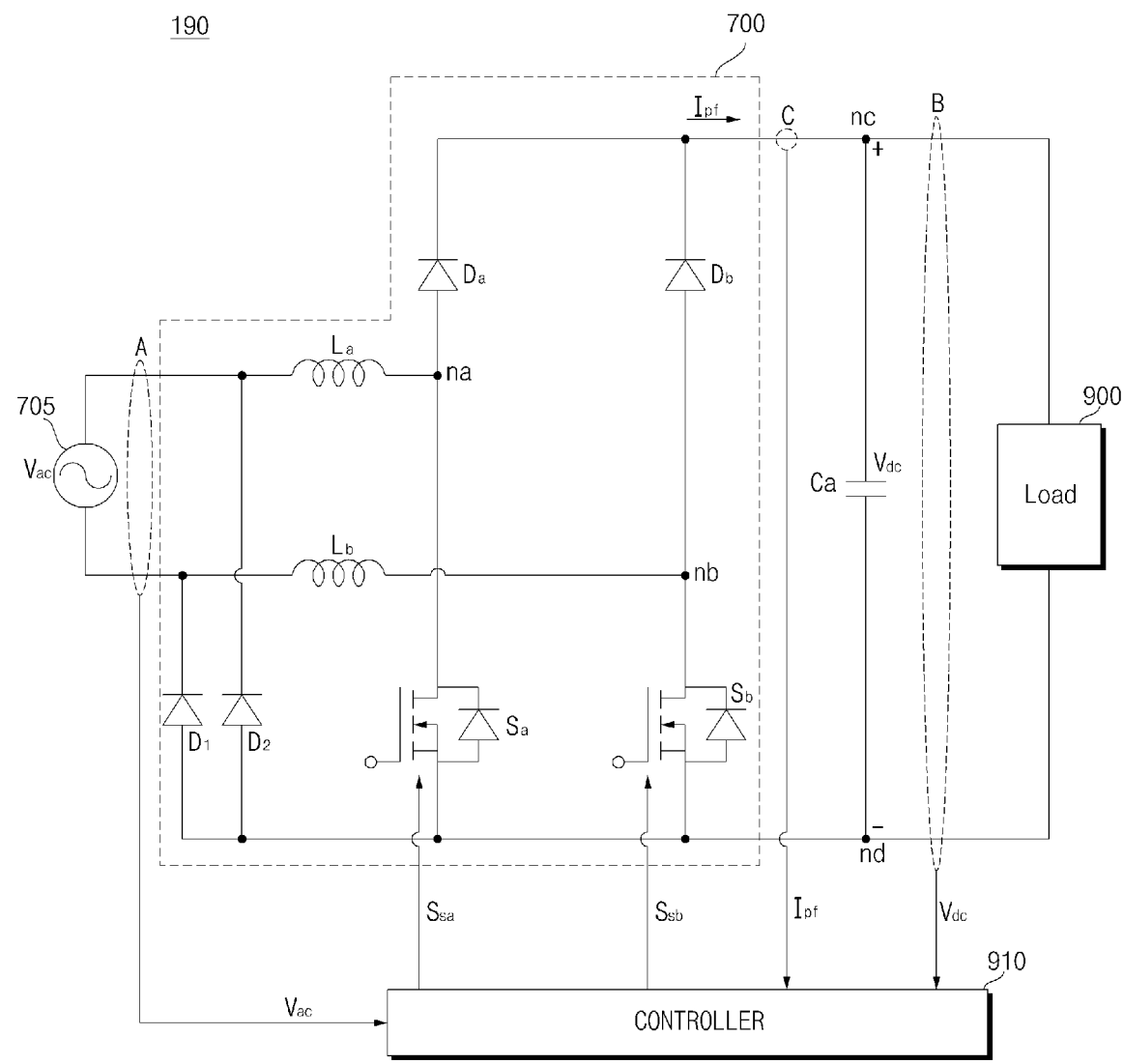
FIG. 9 is an example of an internal circuit diagram of a power supply according to an embodiment of the present invention.

FIG. 9 is an example of an internal circuit diagram of a power supply according to an embodiment of the present invention.

Referring to the drawing, the power supply 190 according to an embodiment of the present invention may include a converter 700 configured to convert input AC power Vac 705 into DC power Vdc and output the DC power Vdc, and a controller 910 configured to control the converter 700.

The power supply 190 according to an embodiment of the present invention may further include an input voltage detector A configured to detect an input AC voltage Vac of the input AC power Vac, a capacitor Ca connected to an output terminal nc-nd of the converter 700, a dc terminal voltage detector B configured to detect a voltage at the output terminal nc-nd of the converter 700, and a current detector C configured to detect a current flowing in the current 700.

The input voltage detector A may detect an input voltage Vac input from the input AC power Vac. To this end, the input voltage detector A may include a resistance element, an amplifier, etc. The detected input voltage Vac is a pulse discrete signal and can be input to the controller 910.

The current detector C may detect a current Ipf flowing in the converter 700. To this end, the current detector C may use a current transformer (CT), a shunt resistor, etc. The detected current Ipf is a pulse discrete signal that can be input to the controller 910.

The dc terminal voltage detector B may detect a dc terminal voltage Vdc at both ends (nc-nd terminal) of the capacitor Ca. To this end, the dc terminal voltage detector B may include a resistor element, an amplification, etc. The detected dc terminal voltage Vdc is a pulse discrete signal that can be input to the controller 910.

The converter 700 may include at least one switching element Sa or Sb, and output DC power Vdc by converting a level of the input power Vac based on a switching operation of the at least one switching element Sa or Sb.

For example, the converter 700 may include four full-bridge switching elements.

For another example, the converter 700 may include two half-bridge switching elements and two diode elements.

Referring to the drawing, the converter 700 may include: a first diode element Da and a first switching element Sa connected in series with each other; and a second diode element Db and a second switching element Sb connected in series with each other and in parallel with the first diode element Da and the first switching element Sa.

Meanwhile, the converter 700 may further include: a first inductor La disposed between a first node na, disposed between the first diode element Da and the first switching element SA, and an input terminal; and a second inductor Lb disposed between a second node nb, disposed between the second diode element Db and the second switching element Sb, and the input terminal. The first inductor La and the second inductor Lb may be connected in parallel with each other.

When detecting the current Ipf flowing in the converter 700, the current detector C may detect a current flowing in the first inductor or a current flowing in the second inductor Lb.

Meanwhile, the converter 700 may further include a diode element disposed between input power 705 and the first inductor La, and a diode element D2 disposed between the input AC power 705 and the second inductor Lb. The diode element D1 and the diode element D2 may be connected in parallel with each other.

Meanwhile, in order to reduce power consumption in the power supply 190, the power supply 190 may operate between a first mode where the switching elements Sa and Sb performs a switching operation continuously or a second mode where the switching elements Sa and Sb stop the switching operation, depending the load 900 at the output terminal nc-nd of the converter 700. Accordingly, power consumption required to display an image may be reduced. In particular, in the second mode, switching is performed a less number of times than in the first mode, thereby reducing switching losses and hence reducing power consumption.

Meanwhile, according to the load 900 at the output terminal nc-nd of the converter 700, the controller 910 may perform control to operate between the first mode, where the switching elements Sa and Sb performs a switching operation continuously, and the second mode, where the switching elements Sa and Sb temporarily stop the switching operation. Accordingly, according to the load 900 at the output terminal nc-nd of the converter 700, power consumption required to display an image may be reduced.

Meanwhile, if the load 900 at the output terminal nc-nd of the converter 700 is equal to or higher than a first level, the controller 910 may perform control to implement the first mode. If the load 900 at the output terminal nc-nd of the converter 700 is lower than the first level, the controller 910 may perform control to implement the second mode. In particular, when the load 900 is lower than the first level, a switching operation is performed according to the second mode, thereby reducing switching losses and hence reducing power consumption.

Meanwhile, the switching elements Sa and Sb may perform a switching operation during a first half cycle between first half cycles (Pca, Pcc, Pce, . . . ) and second half cycles (Pcb, Pcd, . . . ) of cycles of the input AC power Vac, and temporarily stop the switching operation during the second half cycles (Pcb, Pcd, . . . ). In particular, since the switching operation is temporarily stopped during the second half cycles (Pcb, Pcd, . . . ), it is possible to reduce power consumption.

Meanwhile, the power supply 190 may further include an input voltage detector A configured to detect an input AC voltage Vac, and, when the input voltage Vac is equal to or higher than a preset level, the controller 910 may perform control to implement the second mode. Accordingly, since the second mode is performed while the input voltage Vac is stable, it is possible to reduce power consumption.

Meanwhile, the power supply 190 may further include a dc terminal voltage detector B configured to detect a voltage at the output terminal nc-nd of the converter 700. If the voltage at the output terminal nc-nd of the converter 700 is equal to or higher than a first preset level Vre1, the controller 910 may perform control to implement the second mode. If the voltage at the output terminal nc-nd of the converter 700 is equal to or higher than a second preset level Vre2 lower than the first preset level Vre1 and lower than the first preset level Vre1, the controller 910 may perform control to implement the first mode. Accordingly, it is possible to reduce power consumption.

Meanwhile, if the voltage at the output terminal nc-nd of the converter 700 is lower than the second preset level Vre2, the controller 910 may perform control such that the switching operation of the switching elements Sa and Sb is stopped continuously during a period of time longer than a cycle of the input AC power Vac. Accordingly, it is possible to protect a circuit element while reducing power consumption.

Meanwhile, if the level of the load 900 at the output terminal nc-nd of the converter 700 is equal to or lower than the first reference level Lre1, the controller 910 may perform control to implement the second mode. If the level of the load 900 at the output terminal nc-nd of the converter 700 is higher than the first reference level Lre1 and equal to or lower than a second reference level Lre2 higher than the first reference level Lre1. Accordingly, it is possible to reduce power consumption.

Meanwhile, if the level of the load 900 at the output terminal nc-nd of the converter 700 is equal to or higher than the second reference level Lre2, the controller 910 may perform control such that the switching operation of the switching elements Sa and Sb is stopped continuously during a period of time longer than a cycle of the input AC power Vac. Accordingly, it is possible to protect a circuit element while reducing power consumption.

Meanwhile, if a black region accounts for a predetermined percentage or more in an image displayed on the display 180, the controller 910 may perform control to implement the second mode. Accordingly, power consumption according to an image my be reduced.

Meanwhile, the controller 910 may perform control such that the duration of the second mode increases as the percentage of the black area in the entire image increases. Accordingly, by varying power consumption depending on an image, it is possible to efficiently reduce the power consumption.

Meanwhile, if an image displayed on the display 180 is a still image, the controller 910 may perform control to implement the first mode, and, if an image displayed on the display 180 is a moving picture, the controller 910 may perform control to implement the second mode. Accordingly, power consumption mat be reduced depending on an image.

Meanwhile, according to another embodiment of the present invention, according to an image displayed on the display 180, the power supply 190 may operate between a first mode, where a switching operation of the switching elements Sa and Sb is performed, and a second mode, where the switching elements Sa and SB stops the switching operation. Accordingly, it is possible to reduce power consumption depending on an image. Accordingly, power consumption required to display the image may be reduced. In particular, in the second mode, switching is performed a less number of times than in the first mode, thereby reducing switching losses and hence reducing power consumption.

Figure 10:
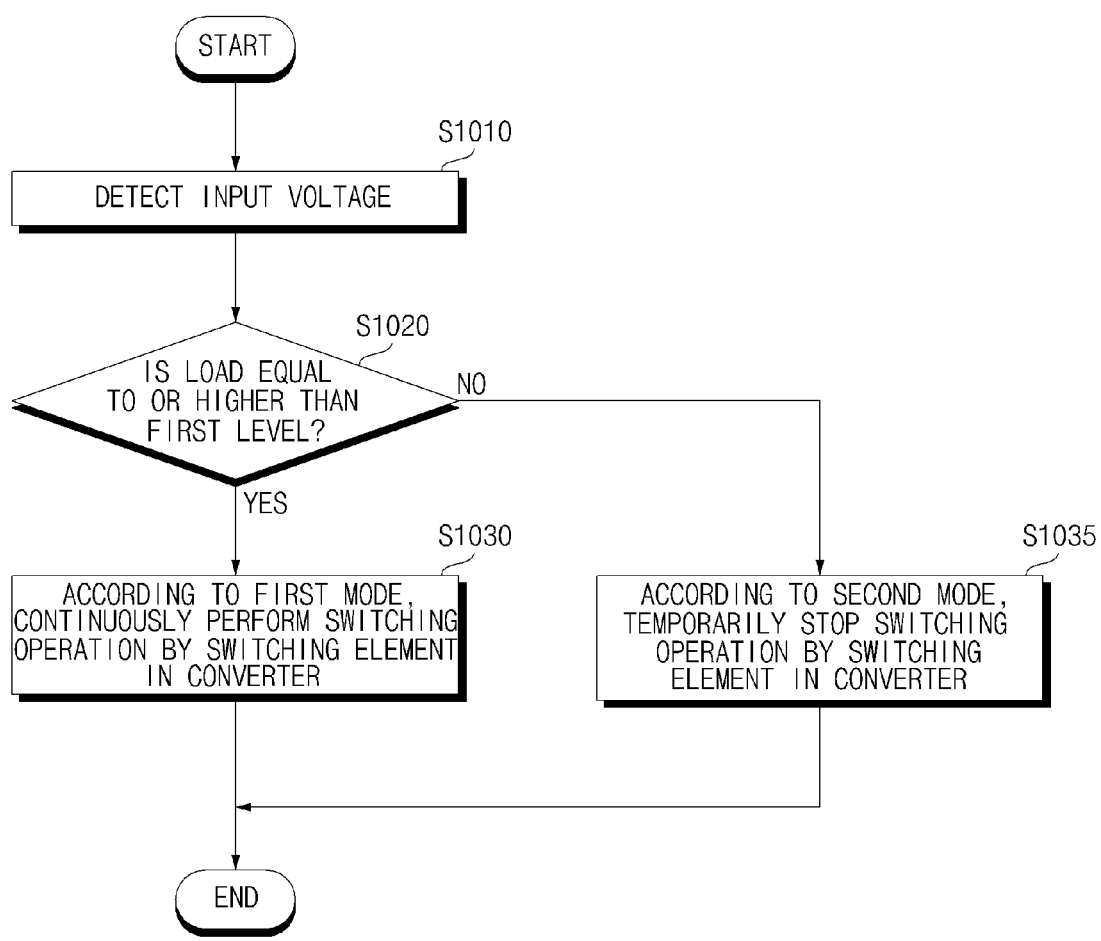
FIG. 10 is a flowchart showing a method for operating an image display apparatus according to an embodiment of the present invention.
Figure 11:
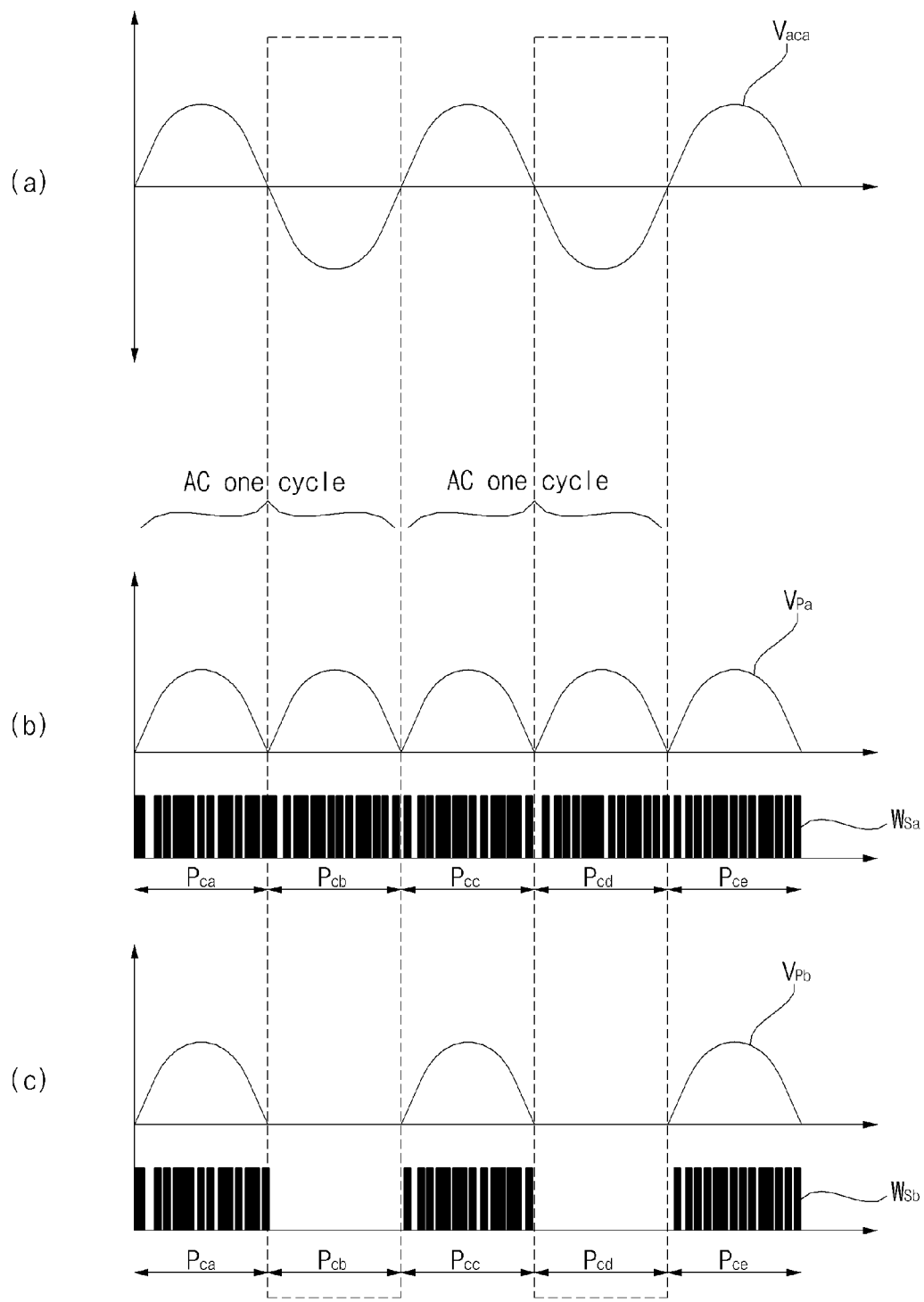
FIGS. 11 to 13 are diagrams referred to in description of the method shown in FIG. 10.
Figure 12A:
Figure 12A:
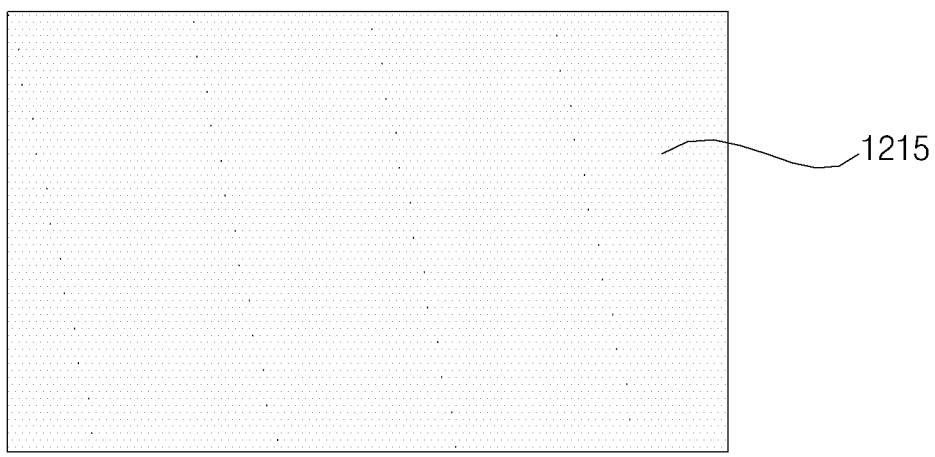
Figure 12B:
Figure 12B:
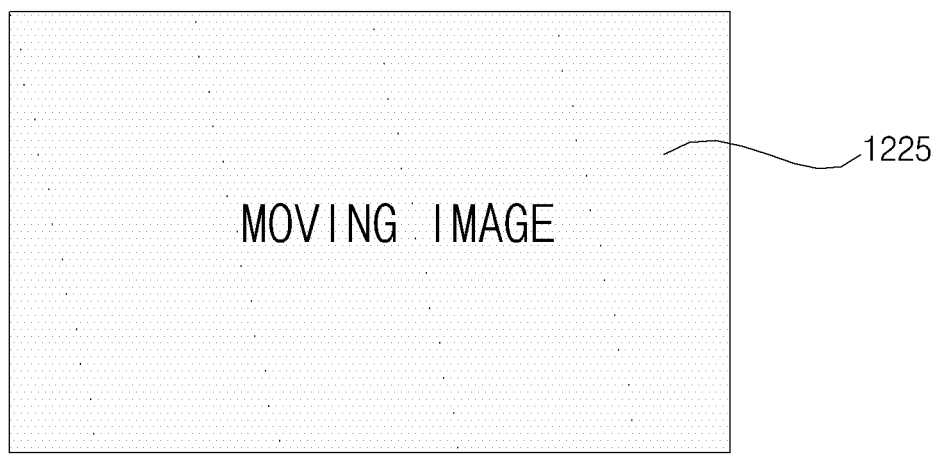
Figure 13:
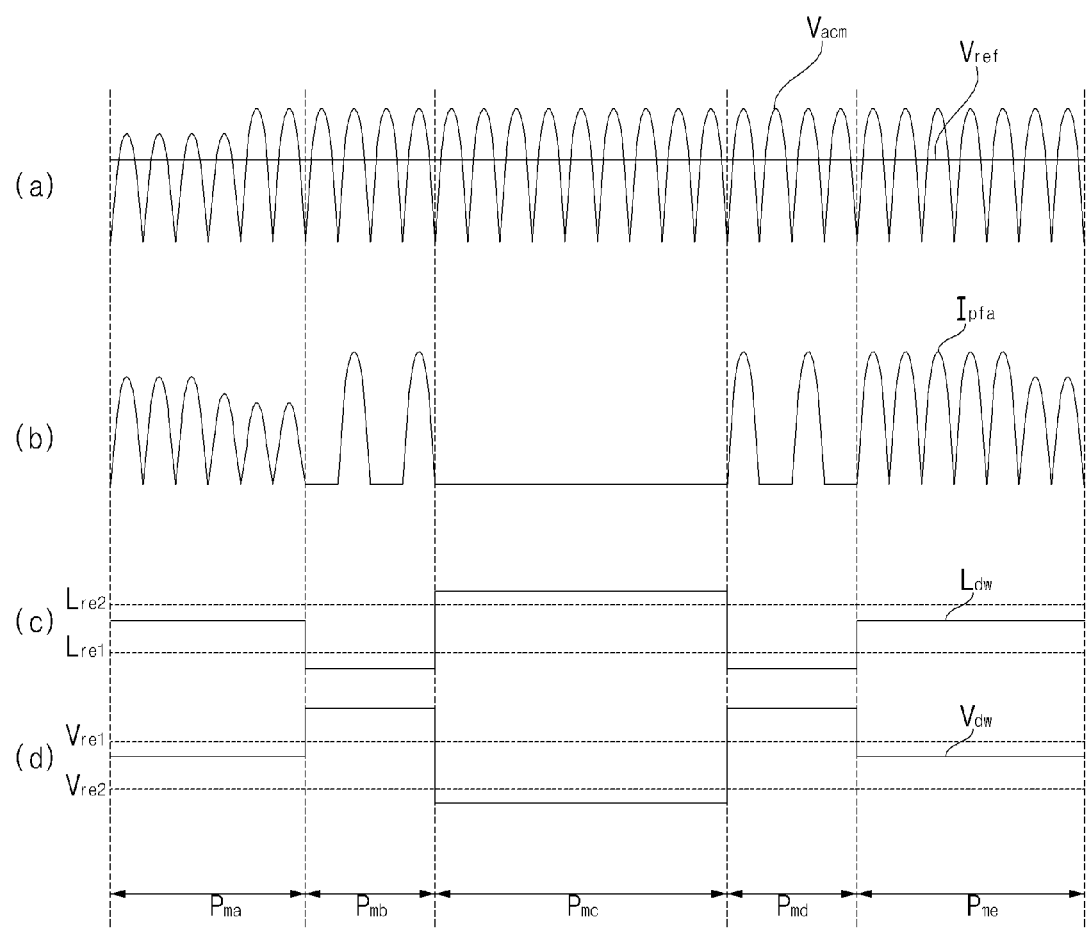

FIG. 10 is a flowchart showing a method for operating an image display apparatus according to an embodiment of the present invention, and FIGS. 11 to 13 are diagrams referred to in description of the method shown in FIG. 10.

Referring to the drawings, the input voltage detector A in the power supply 190 detects an input voltage (S1010). In addition, the dc terminal voltage detector B in the power supply 190 detects a dc terminal voltage.

The controller 910 determines whether the input voltage Vac detected by the input voltage detector A is equal to or higher than a preset level.

Then, in a state in which the input voltage Vac is equal to or higher than the preset level, the controller 910 may calculate the load 900 based on the dc terminal voltage detected by the dc terminal voltage detector B.

For example, if the detected dc terminal voltage, that is, a voltage Vdc at the output terminal nc-nd of the converter 700, is equal to or higher than the first preset level Vre1, the controller 910 may determine a light load indicating that a load is low. If the detected dc terminal voltage, that is, a voltage Vdc at the output terminal nc-nd of the converter 700, is equal to or higher than the second preset level Vre2 lower than the first preset level Vre1 and is lower than the first preset level Vre1, the controller 910 may determine a middle load indicating that a load is high.

Meanwhile, if the detected dc terminal voltage, that is, a voltage Vdc at the output terminal nc-nd of the converter 700, is lower than the second preset level Vre2, the controller 910 may determine a heavy load indicating that a load is significantly high.

Meanwhile, when the level of the load 900 at the output terminal nc-nd of the converter 700 is equal to or lower than the first reference level Lre1, the controller 910 may determine a light load indicating that load is low. When the level of the load 900 at the output terminal nc-nd of the converter 700 is higher than the first reference level Lre1 and equal to or lower than the second reference level Vre2 higher than the first reference level Lre1, the controller 910 may determine a middle load indicating a load is high.

Meanwhile, if the level of the load 900 at the output terminal nc-nd of the converter 700 is equal to or higher than the second reference level Lre2, the controller 910 may determine a heavy load indicating that a load is significantly high.

Meanwhile, when the level of the load 900 is equal to or higher than a first level Lre1, that is, when the level of the load 900 is middle load, the controller 910 may perform control to implement the first mode (S1030). When the level of the load 900 is lower than the first level Lre1, the controller 910 may perform control to implement the second mode.

Here, the first mode may indicate a mode where the switching elements Sa and Sb performs a switching operation continuously, and the second mode may indicate a mode where the switching operation of the switching elements Sa and Sb is stopped.

Detailed description about the first mode and the second mode will be provided with reference to FIG. 11.

FIG. 11(a) shows an example of a waveform of an input AC voltage Vaca.

FIG. 11(b) shows an example of a voltage waveform output from the converter 700.

According to the first mode, a switching operation may be performed continuously during the first half cycles (Pca, Pcc, Pce, . . . ) and the second half cycles (Pcb, Pcd, . . . ) of cycles of the input AC power Vac.

Specifically, the first and second switching elements Sa and Sb may be turned on and off continuously during the first half cycles (Pca, Pcc, Pce, . . . ) and the second half cycles (Pcb, Pcd, . . . ).

Accordingly, as shown in the drawings, a half-wave rectified voltage waveform (Vpa) may be output, and, as a result, a voltage corresponding to the voltage waveform (Vpa) may be stored in the capacitor Ca.

Thus, when the load 900 is a middle load, a appropriate voltage is supplied, and thus, an image may be displayed stably on the display 180.

FIG. 11(c) shows an example of a waveform of a voltage Vpb output from the converter 700 in the second mode.

In the second mode, a switching operation is performed during a first half cycle (Pca) between the first half cycles (Pca, Pcc, Pce, . . . ) and the second half cycles (Pcb, Pcd, . . . ) of cycles of input AC power Vac, and the switching operation is temporarily stopped during the second half cycles (Pcb, Pcd, . . . ).

Specifically, the first and second switching elements Sa and Sb may be turned on and off continuously during the first half cycles (Pca, Pcc, Pce, . . . ), but the first and second switching elements Sa and Sb may be turned off continuously during the second half cycles (Pcb, Pcd, . . . ).

As such, a period in which the first and second switching elements Sa and Sb are temporarily turned off may be called a burst period.

That is, in the second mode, unlike the first mode, there may be a burst period in which the switching operation of the first and second switching elements Sa and Sb is temporarily stopped.

Accordingly, as shown in the drawing, a half-wave rectified waveform Vpb may be output in every half cycle, and, as a result, a voltage corresponding to the voltage waveform Vpb may be stored in the capacitor Ca. In particular, a voltage lower than in the first mode may be stored in the capacitor Ca.

Therefore, if the load 900 is a light load lower than higher than a middle load, a voltage corresponding to the light load is supplied, and accordingly, power consumption while displaying an image on the display 180 may be reduced.

Meanwhile, examples of the middle load may include a still image, an image including a large white area, etc., and examples of the light load may include a moving picture, an image including a large black area, etc.

Meanwhile, FIG. 11(c) shows an example in which one cycle of input AC voltage is divided into a first half cycle and a second half cycle to implement the first mode and the second mode, respectively, but duration of the first mode and duration of the second mode are not necessarily equal to each other.

For example, depending on load or depending on a level of the dc terminal voltage, the controller 910 may perform control such that the duration of the first mode and the duration of the second mode are varied.

Specifically, if a black area accounts for 50% of an image displayed, the first mode may be implemented for 40% of one cycle of input AC power and the second mode may be implemented for 60% thereof, and then, if the percentage of the black area increases to 70%, the first mode may be implemented for 30% of the input AC power and the second mode may be implemented for 70% thereof. Accordingly, it is possible to effectively reduce power consumption.

That is, according to the load 900 at the output terminal nc-nd of the converter 700, the controller 910 may perform control to operate between the first mode, where the switching elements Sa and Sb performs a switching operation continuously, and the second mode, where the switching elements temporarily stop the switching operation. Accordingly, according to the load 900 at the output terminal nc-nd of the converter 700, power consumption required to display an image may be reduced.

FIG. 12A shows an example of an image 1210 including a white area and an image 1215 including a black area.

As described above, in the case where the image 1210 including a white area is displayed on the display 180, the controller 910 may perform control to implement the first mode.

Accordingly, a switching operation may be performed continuously during the first half cycles (Pca, Pcc, Pce, . . . ) and the second half cycles (Pcb, Pcd, . . . ) of cycles of input AC power Vac.

Then, in the case where the image 1215 including a black area is displayed on the display 180, the controller 910 may perform control to implement the second mode.

Accordingly, switching may be performed during the first half cycle (Pca) between the first half cycles (Pca, Pcc, Pce, . . . ) and the second half cycles (Pcb, Pcd, . . . ) of cycles of the input AC power Vac, and the switching may be temporarily stopped during the second half cycles (Pcb, Pcd, . . . ).

FIG. 12B shows an example of a still image 1220 and a moving image 1225.

As described above, if the still image 1220 is displayed on the display 180, the controller 910 may perform control to implement the first mode.

Since the still image 1220 generally includes a black area larger than a white area, it is preferable that the first mode is performed.

Accordingly, the switching operation is performed continuously for the first half cycles (Pca, Pcc, Pce, . . . ) and the second half cycles (Pcb, Pcd, . . . ) of cycles of input AC power Vac.

Then, in the case where the moving image 1225 is displayed on the display 180, the controller 910 may perform control to implement the second mode.

Since the moving image 1225 generally includes a white area larger than a black area, it is preferable that the second mode is performed.

Accordingly, a switching operation is performed during the first half cycle (Pca) between the first half cycles (Pca, Pcc, Pce, . . . ) and the second half cycles (Pcb, Pcd, . . . ) of cycles of the input AC power Vac, and the switching may be temporarily stopped during the second half cycles (Pcb, Pcd, . . . ).

FIG. 13 is a diagram for explanation of a first mode and a second mode.

Referring to the drawing, FIG. 13(a) shows a waveform of an input AC voltage Vacm.

As described above, the controller 910 may determine whether an input voltage Vacm is equal to or higher than a preset level Vref. If the input voltage Vacm is equal to or higher than the preset level Vref, the controller 910 may perform control to implement the second mode.

For example, if the input voltage Vacm is lower than the preset level Vref, the level of the voltage from the converter 700 may be reduced, and hence, the controller 910 may perform control to stop the second mode and implement the first mode.

FIG. 13(b) shows an example of a waveform of a current Ipfa flowing in the converter 700 according to the first mode or the second mode.

Referring to the drawing, in a period (Pma) and a period (Pme), according to the first mode, a switching operation may be performed continuously during the first half cycles (Pca, Pcc, Pce, . . . ) and the second half cycles (Pcb, Pcd, . . . ) of cycles of input AC power Vacm.

Meanwhile, in a period (Pmb) and a period (Pmd), according to the second mode, a switching operation may be performed during the first half cycle (Pca) between the first half cycles (Pca, Pcc, Pce, . . . ) and the second half cycles (Pcb, Pcd, . . . ) of cycles of input AC power Vacm, and the switching operation may be temporarily stopped during the second half cycles (Pcb, Pcd, . . . ).

Meanwhile, in a period (Pmc), according to a third mode, the switching operation may be stopped continuously during a predetermined cycle of the input AC power Vacm.

FIG. 13(c) shows an example of a waveform of load Ldm.

Referring to the drawing, the period (Pma) and the period (Pme) corresponds to the case where the level of the load 900 at the output terminal nc-nd of the converter 700 is higher than the first reference level Lre1 and equal to or lower than the second reference level Vre2, which is higher than the first reference level Lre1. In addition, the period (Pmd) corresponds to the case where the level of the load 900 at the output terminal nc-nd of the converter 700 is equal to or lower than the first reference level Lre1, and the period (Pmc) corresponds to the case where the level of the load 900 at the output terminal nc-nd of the converter 700 is higher than the first reference level Lre1.

In the case where the level of the load 900 is higher than the first reference level Lre1 and equal to or lower than the second reference level Lre2 being higher than the first reference level Lre1, or in other words during the period (Pma) and the period (Pme), the controller 910 may perform control to implement the first mode.

According to the first mode, a switching operation may be performed continuously during the first half cycles (Pca, Pcc, Pce, . . . ) and the second half cycles (Pcb, Pcd, . . . ) of cycles of input AC power Vacm.

Meanwhile, in the case where the level of the load 900 is equal to or lower than the first reference level Lre1, or in other words during the period (Pmb) and the period (Pmd), the controller 910 may perform control to implement the second mode.

According to the second mode, a switching operation may be performed continuously during the first half cycle (Pca) between the first half cycles (Pca, Pcc, Pce, . . . ) and the second half cycles (Pcb, Pcd, . . . ) of cycles of input AC power Vacm, and the switching operation may be temporarily stopped during the second half cycles (Pcb, Pcd, . . . ).

Meanwhile, in the case where the level of the load 900 is higher than the first reference level Lre1, or in other words during the (Pmc) period, the controller 910 may perform control to implement the third mode.

According to the third mode, a switching operation may be stopped continuously for predetermined cycles of the input AC power Vacm. In particular, it may be controlled such that the switching operation is stopped continuously during a period of time longer than a cycle of the input AC power Vacm.

As such, as switching operation of a switching element in the converter 700 is controlled differently according to a load, it is possible to reduce power consumption and protect a circuit element.

FIG. 13(d) shows an example of a waveform of a dc terminal voltage Vdm.

Referring to the drawing, the period (Pma) and the period (Pme) correspond to the case where a voltage from the output terminal nc-nd of the converter 700 is equal to or higher than the second preset level Vre2 lower than the first preset level Vre1 and is lower than the first preset level Vre1. The period (Pmb) and the period (Pmd) correspond to the case where a voltage from the output terminal nc-nd of the converter 700 is equal to or higher than the first preset level Vre1. The period (Pmc) corresponds to the case where a voltage from the output terminal nc-nd of the converter 700 is higher than the first reference level Lre1.

In the case where a voltage from the output terminal nc-nd of the converter is equal to or higher than the second preset level Vre2 lower than the first preset level Vre1 and is lower than the first preset level Vre1, or in other words during the period (Pma) and the period (Pme), the controller 910 may perform control to implement the first mode.

According to the first mode, a switching operation may be performed continuously for the first half cycles (Pca, Pcc, Pce, . . . ) and the second half cycles (Pcb, Pcd, . . . ) of cycles of the input AC power Vacm.

Meanwhile, in the case where a voltage from the output terminal nc-nd of the converter 700 is equal to or higher than the first preset level Vre1, or in other words during the period (Pmb) and the period (Pmd), the controller 910 may perform control to implement the second mode.

According to the second mode, a switching operation may be performed during the first half cycle (Pca) between the first half cycles (Pca, Pcc, Pce, . . . ) and the second half cycles (Pcb, Pcd, . . . ) of cycles of the input AC power Vacm, and the switching operation may be temporarily stopped during the second half cycles (Pcb, Pcd, . . . ).

Meanwhile, in the case where a voltage from the output terminal nc-nd of the converter 700 is lower than the second reference level Vre2, or in other words during the period (Pmc), the controller 910 may perform control to implement a third mode.

According to the third mode, a switching operation may be stopped continuously during a predetermined cycle of the input AC power Vacm. In particular, it may be controlled such that the switching operation is stopped continuously during a period of time longer than a cycle of the input AC power Vacm.

As such, by controlling a switching operation of a switching element in the converter 700 differently according to load, it is possible to reduce power consumption and protect a circuit element.

Meanwhile, according to the present invention, the method of operating the image display apparatus in the present specification can be implemented with a code readable by a processor in a recording media readable by the processor. The examples of the recording media readable by the processor may include a ROM (read only memory), a RAM (random access memory), a CD-ROM, a magnetic tape, a floppy disc, an optical data storing device and the like. And, implementing in a form of a carrier wave (e.g., transmission via the internet and the like) is also included. And, the recording media readable by the processor are distributed to computer systems connected with each other via a network. Hence, a code readable by the processor is stored and executed using a distribution scheme.

Hereinabove, although the present invention has been described with reference to exemplary embodiments and the accompanying drawings, the present invention is not limited thereto, but may be variously modified and altered by those skilled in the art to which the present invention pertains without departing from the spirit and scope of the present invention claimed in the following claims.

What is claimed is:

1. An image display apparatus comprising:
a display; and
a power supply comprising:
a converter including at least one switching element and configured to supply power to the display and a controller configured to control the converter;
wherein the power supply is configured to output direct-current (DC) power by converting a level of input power based on a switching operation of the at least one switching element,
wherein the power supply is further configured to operate in a first mode or a second mode,
wherein in the first mode the switching operation is continuously performed by the at least one switching element, and in the second mode the switching operation is discontinuously performed by the at least one switching element,
wherein the controller is further configured to:
determine the mode of operation as the second mode based on a level of a load at the output terminal of the converter being equal to or lower than a first reference level; and
determine the mode of operation as the first mode based on the level of the load at the output terminal of the converter being higher than the first reference level and equal to or lower than a second reference level higher than the first reference level.

2. The image display apparatus of claim 1, wherein, in the second mode, the at least one switching element performs a switching operation during a first half cycle among the first half cycle and a second half cycle of a cycle of input AC power, and temporarily stops the switching operation during the second half cycle.

3. The image display apparatus of claim 2, wherein, in the first mode, the at least one switching element continuously performs the switching operation during the first half cycle and the second half cycle.

4. The image display apparatus of claim 1,
wherein the power supply further comprises an input voltage detector configured to detect an input AC voltage of the input AC power, and
wherein the controller is further configured to determine the mode of operation as the second mode based on the input AC voltage being equal to or higher than a preset input voltage level.

5. The image display apparatus of claim 1,
wherein the power supply further comprises a DC terminal voltage detector configured to detect a voltage at an output terminal of the converter, and
wherein the controller is further configured to determine the mode of operation as the second mode based on the voltage at the output terminal of the converter being equal to or higher than a first preset level, and
wherein the controller is further configured to determine the mode of operation as the first mode based on the voltage at the output terminal of the converter being lower than the first preset level and equal to or higher than a second preset level that is lower than the first preset level.

6. The image display apparatus of claim 5, wherein the controller is further configured to stop the switching operation of the at least one switching element during a period of time longer than a cycle of the input AC power when the voltage at the output terminal of the converter is lower than the second preset level.

7. The image display apparatus of claim 1, wherein the controller is further configured to stop the switching operation of the at least one switching element during a period of time longer than a cycle of input AC power based on the level of the load at the output terminal of the converter being equal to or higher than the second reference level.

8. The image display apparatus of claim 1, wherein the controller is further configured to determine the mode of operation as the second mode based on a black area accounting for a predetermined percentage or more of an area of an image displayed on the display.

9. The image display apparatus of claim 8, wherein a duration of operation in the second mode is increased as a percentage of the black area of the area of the image is increased.

10. The image display apparatus of claim 1, wherein the controller is further configured to:
determine the mode of operation as the first mode based on an image displayed on the display being a still image; and determine the mode of operation as the second mode based on the image displayed on the display being a moving image.

11. The image display apparatus of claim 1, wherein the converter comprises:
    a first diode element and a first switching element connected in series with each other; and
    a second diode element and a second switching element connected in series with each other and in parallel with the first diode element and the first switching element.

12. The image display apparatus of claim 11, wherein the converter further comprises:
    a first inductor disposed between a first node and an input terminal, wherein the first node is disposed between the first diode element and the first switching element; and
    a second inductor disposed between a second node and the input terminal, wherein the second node is disposed between the second diode element and the second switching element.

* * * * *